(12) United States Patent
Tomayko et al.

(10) Patent No.: US 8,434,564 B2
(45) Date of Patent: May 7, 2013

(54) POWER TOOL

(75) Inventors: David C. Tomayko, Ellicott City, MD (US); Qiang Zhang, Baltimore, MD (US); Mark R. Poetzl, Rising Sun, MD (US); Stephen A. Debellius, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/546,759

(22) Filed: Jul. 11, 2012

(65) Prior Publication Data

US 2012/0279738 A1    Nov. 8, 2012

Related U.S. Application Data

(63) Continuation of application No. 12/610,762, filed on Nov. 2, 2009, now Pat. No. 8,251,158.

(60) Provisional application No. 61/112,741, filed on Nov. 8, 2008.

(51) Int. Cl.
*B25F 5/00* (2006.01)
(52) U.S. Cl.
USPC ............. 173/47; 173/216; 173/217; 475/220; 475/298; 475/331
(58) Field of Classification Search ............... 173/47, 173/216–217; 475/220, 298, 331
See application file for complete search history.

(56) References Cited

U.S. PATENT DOCUMENTS

| 742,812 A | 10/1903 | Winton |
|---|---|---|
| 1,228,472 A | 6/1917 | Olson |
| 1,401,659 A | 12/1921 | Ward |
| 1,404,984 A | 1/1922 | Lower |
| 1,427,599 A | 8/1922 | Johanson |
| 1,508,193 A | 9/1924 | Lord |
| 1,514,872 A | 11/1924 | Starr |
| 1,693,139 A | 11/1928 | Dietsche |
| 1,777,997 A | 10/1930 | Wise |
| 1,792,484 A | 2/1931 | Fawick |
| 1,909,330 A | 5/1933 | Banker |
| 2,066,952 A | 1/1937 | Tornebohm |
| 2,137,778 A | 11/1938 | McCullough |
| 2,169,523 A | 8/1939 | Fleischel |
| 2,331,684 A | 10/1943 | Henningsen |
| 2,466,683 A | 4/1949 | Buckendale |
| 2,493,592 A | 1/1950 | Peabody |

(Continued)

FOREIGN PATENT DOCUMENTS

| DE | 39 04 085 A1 | 8/1990 |
|---|---|---|
| DE | 4038502 A1 | 6/1992 |

(Continued)

*Primary Examiner* — Brian D Nash
*Assistant Examiner* — Michelle Lopez
(74) *Attorney, Agent, or Firm* — Harness, Dickey & Pierce, P.L.C.

(57) ABSTRACT

A power tool having a drive component and a housing. In one form, the drive component can be a transmission having a planetary stage with planet gears rotatably mounted on pins of a planet carrier. The pins are spaced circumferentially around the planet carrier such that each pair of adjacent pins is spaced apart by a spacing angle. At least two different spacing angles are employed. In another form, the drive component is selected from at least one of a motor, a transmission and a clutch and the housing is configured with first and second housing components and at least one set of mating conically-shaped features that can cooperate to align the housing components to an axis.

12 Claims, 22 Drawing Sheets

U.S. PATENT DOCUMENTS

| | | |
|---|---|---|
| 2,848,908 A | 8/1958 | Hollis |
| 2,899,030 A | 8/1959 | Douglas et al. |
| 2,911,854 A | 11/1959 | Fabian |
| 2,949,795 A | 8/1960 | Morey et al. |
| 3,055,236 A | 9/1962 | Born, Jr. |
| 3,127,801 A | 4/1964 | Binns |
| 3,170,588 A | 2/1965 | Lyon, Jr. |
| 3,470,930 A | 10/1969 | Jurczenia |
| 3,491,863 A | 1/1970 | Karlsson et al. |
| 3,500,696 A | 3/1970 | Berube |
| 3,513,724 A | 5/1970 | Box |
| 3,648,784 A | 3/1972 | Schoeps |
| 3,732,616 A | 5/1973 | Masrrodonato et al. |
| 3,774,476 A | 11/1973 | Sohnlein et al. |
| 3,872,742 A | 3/1975 | States |
| 3,878,926 A | 4/1975 | Adachi |
| 3,901,104 A | 8/1975 | Sims |
| 3,918,560 A | 11/1975 | Zach, Jr. |
| 3,942,337 A | 3/1976 | Leonard et al. |
| 3,972,742 A | 8/1976 | Cline et al. |
| 4,070,927 A | 1/1978 | Polak |
| 4,178,813 A | 12/1979 | Smemo |
| 4,181,041 A | 1/1980 | Frost |
| 4,189,960 A | 2/1980 | Holdeman |
| 4,233,851 A | 11/1980 | Kemper |
| 4,255,987 A | 3/1981 | Ciolli |
| 4,274,023 A | 6/1981 | Lamprey |
| 4,274,304 A | 6/1981 | Curtiss |
| 4,347,762 A | 9/1982 | Holdeman |
| 4,366,871 A | 1/1983 | Dieterle et al. |
| 4,416,168 A | 11/1983 | Arai et al. |
| 4,416,340 A | 11/1983 | Bailey |
| 4,418,766 A | 12/1983 | Grossmann |
| 4,448,098 A | 5/1984 | Totsu |
| 4,453,430 A | 6/1984 | Sell |
| 4,493,223 A | 1/1985 | Kishi et al. |
| 4,536,688 A | 8/1985 | Roger |
| 4,569,252 A | 2/1986 | Harper |
| 4,585,077 A | 4/1986 | Bergler |
| 4,617,837 A | 10/1986 | Kataoka et al. |
| 4,621,541 A | 11/1986 | Takahashi |
| 4,626,142 A | 12/1986 | Brin et al. |
| 4,641,551 A | 2/1987 | Pascaloff |
| 4,644,822 A | 2/1987 | Batchelor |
| 4,651,580 A | 3/1987 | Deane |
| 4,705,163 A | 11/1987 | James |
| 4,710,071 A | 12/1987 | Koehler et al. |
| 4,757,598 A | 7/1988 | Redman |
| 4,758,755 A | 7/1988 | Sherman et al. |
| 4,772,765 A | 9/1988 | Markle et al. |
| 4,791,833 A | 12/1988 | Sakai et al. |
| 4,805,485 A | 2/1989 | Ida et al. |
| 4,841,187 A | 6/1989 | Hauke et al. |
| 4,842,078 A | 6/1989 | Hansson |
| 4,869,131 A | 9/1989 | Ohmori |
| 4,875,528 A | 10/1989 | Thackston |
| 4,892,013 A | 1/1990 | Satoh |
| 4,901,987 A | 2/1990 | Greenhill et al. |
| 4,908,926 A | 3/1990 | Takeshima et al. |
| 5,005,682 A | 4/1991 | Young et al. |
| 5,019,023 A | 5/1991 | Kurosawa |
| 5,046,998 A | 9/1991 | Frost |
| 5,050,291 A | 9/1991 | Gilmore |
| 5,145,276 A | 9/1992 | Demange |
| 5,159,986 A | 11/1992 | Hoser |
| 5,176,593 A | 1/1993 | Yasui et al. |
| 5,277,527 A | 1/1994 | Yokota et al. |
| 5,282,510 A | 2/1994 | Pacher |
| 5,301,565 A | 4/1994 | Weismann et al. |
| 5,327,036 A | 7/1994 | Carey |
| 5,339,908 A | 8/1994 | Yokota et al. |
| 5,411,447 A | 5/1995 | Frost |
| 5,450,773 A | 9/1995 | Darrah et al. |
| 5,451,127 A | 9/1995 | Chung |
| 5,458,206 A | 10/1995 | Bourner et al. |
| 5,540,416 A | 7/1996 | Huang |
| 5,550,416 A | 8/1996 | Fanchang et al. |
| 5,551,927 A | 9/1996 | Enzmann et al. |
| 5,558,393 A | 9/1996 | Hawkins et al. |
| 5,573,074 A | 11/1996 | Thames et al. |
| 5,588,930 A | 12/1996 | Chen et al. |
| 5,598,911 A | 2/1997 | Joachim et al. |
| 5,601,491 A | 2/1997 | Chan et al. |
| 5,622,358 A | 4/1997 | Komura et al. |
| 5,662,545 A | 9/1997 | Zimmerman et al. |
| 5,685,796 A | 11/1997 | Chen et al. |
| 5,692,575 A | 12/1997 | Hellstrom |
| 5,704,433 A | 1/1998 | Bourner et al. |
| 5,730,232 A | 3/1998 | Mixer |
| 5,842,527 A | 12/1998 | Arakawa et al. |
| 5,873,269 A | 2/1999 | Hong et al. |
| 5,897,454 A | 4/1999 | Cannaliato |
| 5,903,462 A | 5/1999 | Wagner et al. |
| 5,954,608 A | 9/1999 | Kirkwood et al. |
| 5,964,333 A | 10/1999 | Grosspietsch et al. |
| 5,967,934 A | 10/1999 | Ishida et al. |
| 5,992,257 A | 11/1999 | Nemetz et al. |
| 6,062,114 A | 5/2000 | Rahm |
| 6,068,250 A | 5/2000 | Hawkins et al. |
| 6,070,675 A | 6/2000 | Mayer et al. |
| 6,073,939 A | 6/2000 | Steadings et al. |
| 6,076,438 A | 6/2000 | Rahm |
| 6,086,502 A | 7/2000 | Chung |
| 6,093,128 A | 7/2000 | Seith |
| 6,093,130 A | 7/2000 | Buck et al. |
| 6,142,242 A | 11/2000 | Okumura et al. |
| 6,165,103 A | 12/2000 | Tenzor et al. |
| 6,179,301 B1 | 1/2001 | Steadings et al. |
| 6,186,709 B1 | 2/2001 | Hsu |
| 6,193,629 B1 | 2/2001 | Tenzor et al. |
| 6,199,640 B1 | 3/2001 | Hecht |
| 6,223,833 B1 | 5/2001 | Thurler et al. |
| 6,231,432 B1 | 5/2001 | Peterson et al. |
| 6,251,040 B1 | 6/2001 | Safont et al. |
| 6,305,481 B1 | 10/2001 | Yamazaki et al. |
| 6,431,289 B1 | 8/2002 | Potter et al. |
| 6,435,521 B2 | 8/2002 | Steadings et al. |
| 6,457,535 B1 | 10/2002 | Tanaka |
| 6,502,648 B2 | 1/2003 | Milbourne |
| 6,533,093 B2 | 3/2003 | Chen |
| 6,550,546 B2 | 4/2003 | Thurler et al. |
| 6,595,303 B2 | 7/2003 | Noe et al. |
| 6,599,219 B2 | 7/2003 | Pan |
| 6,612,556 B2 | 9/2003 | Petrina |
| 6,619,149 B2 | 9/2003 | Funfer |
| 6,655,470 B1 | 12/2003 | Chen |
| 6,669,184 B2 | 12/2003 | Cai et al. |
| 6,676,557 B2 | 1/2004 | Milbourne et al. |
| 6,691,796 B1 | 2/2004 | Wu |
| 6,705,446 B2 | 3/2004 | Drussel et al. |
| 6,758,465 B1 | 7/2004 | Greenhill et al. |
| 6,796,921 B1 | 9/2004 | Buck et al. |
| 6,805,207 B2 | 10/2004 | Hagan et al. |
| 6,814,208 B2 | 11/2004 | Drussel et al. |
| 6,832,764 B2 | 12/2004 | Steadings et al. |
| 6,857,983 B2 | 2/2005 | Milbourne et al. |
| 6,860,341 B2 | 3/2005 | Spielmann et al. |
| 6,862,952 B2 | 3/2005 | Aeberhard |
| 6,892,827 B2 | 5/2005 | Toyama et al. |
| 6,892,830 B2 | 5/2005 | Noe et al. |
| 6,939,262 B1 | 9/2005 | Yu |
| 6,968,144 B2 | 11/2005 | Mizoguchi |
| 6,976,545 B2 | 12/2005 | Greitmann |
| 6,983,810 B2 | 1/2006 | Hara et al. |
| 6,984,188 B2 | 1/2006 | Potter et al. |
| 7,005,767 B2 | 2/2006 | Oh et al. |
| 7,014,026 B2 | 3/2006 | Drussel et al. |
| 7,028,784 B2 | 4/2006 | Breitenmoser |
| 7,044,882 B2 | 5/2006 | Eisenhardt |
| 7,066,691 B2 | 6/2006 | Doyle et al. |
| 7,086,483 B2 | 8/2006 | Arimura et al. |
| 7,121,361 B2 | 10/2006 | Hara et al. |
| 7,124,839 B2 | 10/2006 | Furuta et al. |
| 7,128,503 B2 | 10/2006 | Steadings et al. |
| 7,131,503 B2 | 11/2006 | Furuta et al. |
| 7,201,235 B2 | 4/2007 | Umemura et al. |
| 7,210,181 B1 | 5/2007 | Price |

| | | | | | | |
|---|---|---|---|---|---|---|
| 7,220,211 B2 | 5/2007 | Potter et al. | | FOREIGN PATENT DOCUMENTS | | |
| 7,225,884 B2 | 6/2007 | Aeberhard | DE | 9404069 U1 | 6/1994 | |
| 7,237,988 B2 | 7/2007 | Steadings et al. | DE | 9406626 U1 | 6/1994 | |
| 7,264,065 B2 | 9/2007 | Simm et al. | DE | 20209356 U1 | 10/2002 | |
| 7,308,948 B2 | 12/2007 | Furuta | DE | 10156392 A1 | 6/2003 | |
| 7,380,613 B2 | 6/2008 | Furuta | DE | 20304314 U1 | 7/2003 | |
| 7,407,460 B2 | 8/2008 | Eisenhardt | DE | 20305853 U1 | 9/2003 | |
| 7,416,031 B2 | 8/2008 | Murakami et al. | EP | 0706861 A1 | 4/1996 | |
| 7,694,750 B2 | 4/2010 | Tsubakimoto et al. | EP | 1445074 A1 | 8/2004 | |
| 2003/0000793 A1 | 1/2003 | Brock et al. | GB | 2274416 A | 7/1994 | |
| 2003/0150857 A1 | 8/2003 | Tsai | GB | 2334909 A | 9/1999 | |
| 2004/0211576 A1 | 10/2004 | Milbourne et al. | GB | 2383387 A | 6/2003 | |
| 2005/0028997 A1 | 2/2005 | Hagan et al. | GB | 2396390 A | 6/2004 | |
| 2005/0061521 A1 | 3/2005 | Saito et al. | GB | 2404891 A | 2/2005 | |
| 2005/0061524 A1 | 3/2005 | Hagan et al. | JP | 2096781 A | 4/1990 | |
| 2005/0215385 A1 | 9/2005 | Spielmann et al. | JP | 3084138 A | 4/1991 | |
| 2005/0236170 A1 | 10/2005 | Lee | JP | 3103507 A | 4/1991 | |
| 2006/0118314 A1 | 6/2006 | Aeberhard et al. | JP | 3168363 A | 7/1991 | |
| 2006/0166510 A1 | 7/2006 | Okayama | JP | 3291609 A | 12/1991 | |
| 2006/0201688 A1 | 9/2006 | Jenner et al. | JP | 7009357 A | 1/1995 | |
| 2006/0213675 A1 | 9/2006 | Whitmire et al. | JP | 2001194371 A | 7/2001 | |
| 2006/0237205 A1 | 10/2006 | Sia et al. | JP | 2002307121 A | 10/2002 | |
| 2006/0254786 A1 | 11/2006 | Murakami et al. | JP | 2005193391 A | 7/2005 | |
| 2007/0021766 A1 | 1/2007 | Belagali et al. | JP | 2006123080 A | 5/2006 | |
| 2007/0068693 A1 | 3/2007 | Whitmire et al. | JP | 2006123081 A | 5/2006 | |
| 2007/0084614 A1 | 4/2007 | Whitmire et al. | JP | 2006181646 A | 7/2006 | |
| 2007/0131439 A1 | 6/2007 | Hashimoto et al. | WO | WO-9404320 A1 | 3/1994 | |
| 2007/0252346 A1 | 11/2007 | Steadings et al. | | | | |
| 2010/0300714 A1 | 12/2010 | Trautner | | | | |

POWER TOOL

CROSS-REFERENCE TO RELATED APPLICATIONS

This application is a continuation of U.S. Ser. No. 12/610,762 filed Nov. 2, 2009 now U.S. Pat. No. 8,251,158, which claims the benefit of U.S. Provisional Application No. 61/112,741 filed Nov. 8, 2008. The disclosure of each of the aforementioned applications is incorporated by reference as if fully set forth in detail herein.

INTRODUCTION

The present disclosure generally relates to power tools, including power tools such as rotatable drill/drivers, hammer drill/drivers, hammer drills, screwdrivers, rotary hammers and rotatable cutting devices. More particularly, the present disclosure relates to a transmission for a power tool and a housing for a power tool.

A power tool is described in U.S. Pat. Nos. 6,431,289 and 7,314,097. These power tools employ a three-speed transmission and a switching mechanism. Additionally, the '097 patent employs a mode change mechanism. While such power tools are relatively robust, compact and inexpensive, there nonetheless remains a need in the art for an improved power tool that incorporates an improved transmission and/or housing configuration.

SUMMARY

This section provides a general summary of the disclosure, and is not a comprehensive disclosure of its full scope or all of its features.

In one form, the present teachings provide a power tool that includes a housing, a motor, a trigger, an output spindle, a multi-speed transmission and a switch mechanism. The housing defines a handle and a body into which the motor is received. The trigger is mounted to the handle and is coupled to the motor. The trigger is configured to control operation of the motor in response to an input provided by an operator of the power tool by coupling the motor to a source of power. The multi-speed transmission couples the motor and the output member. The switch mechanism includes an actuator, a rail, a switch, a first biasing spring, and a second biasing spring. The actuator is movable along a longitudinal axis of the multi-speed transmission between a plurality of positions. The actuator is engaged to one or more members of the multi-speed transmission at each of the plurality of actuator positions such that the multi-speed transmission operates in a corresponding one of a plurality of different overall speed reduction ratios. The actuator is non-rotatably but axially slidably engaged to the housing. The rail is fixedly coupled to the actuator and is received through the switch such that the switch is mounted on the rail for sliding movement thereon. The first biasing spring is disposed between the actuator and the switch and biases the switch away from the actuator. The second biasing spring is disposed between the switch and an end of the rail opposite the actuator and biases the switch away from the end of the rail.

In another form, the present teachings provide a power tool with a housing, a motor, a trigger, an output member, a multi-speed transmission and a switch mechanism. The housing defines a handle and a body into which the motor is received. The trigger is mounted to the handle and coupled to the motor. The trigger is configured to control operation of the motor in response to an input provided by an operator of the power tool by coupling the motor to a source of power. The multi-speed transmission couples the motor and the output member. The switch mechanism has a switch and an actuator. The switch is movable between a first switch position, a second switch position, and a third switch position. The actuator is non-rotatably but axially slidably disposed in the housing between a first actuator position, a second actuator position, and a third actuator position. The actuator is engaged to one or more members of the multi-speed transmission at each of the first, second and third actuator positions such that the multi-speed transmission operates in a corresponding one of a plurality of different overall speed reduction ratios. The multi-speed transmission and the switch mechanism are configured such that: the actuator will move with the switch when the switch is moved from the second switch position to the third switch position, the switch can move relative to the actuator when the switch is moved from the third switch position to the second switch position or from the second switch position to the first switch position, and the switch can move relative to the actuator when the switch is moved from the first switch position to the second switch position.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The transmission includes a first planetary stage and a second planetary stage. The first planetary stage includes a planet carrier and a plurality of planet gears. The planet carrier includes a plurality of pins onto which the planet gears are journally mounted. The second planetary stage comprises a sun gear having an outer diameter onto which a plurality of sun gear teeth is formed. The pins of the planet carrier are mounted to the sun gear radially inward of the sun gear teeth and no portion of the sun gear that transmits torque is bigger in diameter than the outside diameter of the sun gear as measured across the sun gear teeth.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The transmission includes a first planetary stage and a second planetary stage. The first planetary stage comprises a compound planet gear having a first ring gear, a second ring gear, and a first planet gear portion, which is meshingly engaged to the first ring gear, and a second planet gear portion that is coupled for rotation with the first planet gear portion and meshingly engaged with the second ring gear. The second planetary stage comprises a third ring gear that is axially movable between a first position, in which the third ring gear is meshingly engaged with a rotating component of the transmission, and a second position in which the third ring gear is disengaged from the rotating component.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The transmission includes a planetary stage having compound planetary gears with a first portion that is engaged to a first ring gear and a second portion that is engaged to a second ring gear. The compound planetary gears are not timed to another gear in the transmission.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The transmission includes a planetary stage having a ring gear, a planet carrier and a plurality of planet gears. The planetary gears are meshingly engaged with the ring gear and journally supported on pins of the planet carrier. Adjacent ones of the pins are spaced apart by an angular spacing. Two or more different angular spacings are employed to thereby space the planet gears unevenly about the ring gear.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The power tool also includes a mode change mechanism having a cam, a cam follower, a planet gear and a ring gear. The cam is rotatably mounted in the housing, while the cam follower is engaged to the cam and non-rotatably but axially slidably mounted in the housing. The planet gear is meshingly engaged with the ring gear and teeth formed on the cam. Rotation of the ring gear generates corresponding rotation or the cam to cause axial translation of the cam follower in the housing. The cam follower is employed to selectively lock-out a torque clutch, position an axially movable hammer ratchet into a zone where it may be engaged by a rotary hammer ratchet that is mounted on the output spindle, or both.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The power tool also includes a spindle lock with a bushing that is coupled to an output member of the transmission at a first interface and to the output spindle at a second interface. At least one of the first and second interfaces is defined by a female portion and a male portion that is received in the female portion. The female portion includes a plurality of first V-shaped sidewalls that have peaks that face radially inwardly, while the male portion comprising a plurality of second V-shaped sidewalls that are engaged the first V-shaped sidewalls. Each of the first V-shaped sidewalls is defined by a first interior angle, and each of the second V-shaped sidewalls being defined by a second interior angle that is smaller than the first interior angle to rotationally couple the female portion and male portion in a manner that provides limited rotational movement there between.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The power tool further includes a clutch having a plurality of follower members and a clutch spring. The follower members are received between a clutch profile on a ring gear of the transmission and the clutch spring. The clutch spring biases the follower members into engagement with the clutch profile. The clutch spring is an annular wave spring having a non-linear spring rate and preferably, a non-linear spring rate in which a plot depicting a load exerted by the clutch spring as a function of clutch spring deflection has a distinct knee between a first portion, which is generally defined by a first spring rate, and a second portion that is generally defined by a second spring rate that is greater than the first spring rate.

In still another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The power tool further includes a torque clutch and a clutch bypass member. The torque clutch includes a clutch profile, which is coupled to a ring gear of the transmission, and a follower member that is biased into engagement with the clutch profile to resist rotation of the ring gear when a magnitude of the torque output from the power tool does not exceed a clutch torque. The clutch bypass member includes a plurality of lugs that are non-rotatably but slidably engaged to the housing. The clutch bypass member is axially movable between a first position, in which lugs are axially separated from the ring gear, and a second position in which the lugs are received within the ring gear such that the lugs are positioned radially inwardly of the clutch profile.

In yet another form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The transmission includes a planetary stage having a ring gear, the ring gear being axially movable between a first position and a second position to cause a change in a speed ratio of the transmission, the power tool further comprising a spring that is mounted coaxially about the transmission to bias the ring gear into one of the first and second positions In a further form, the present teachings provide a power tool with a housing, a motor, a trigger, an output member and a transmission. The housing defines a handle and a body into which the motor is received. The trigger is mounted to the handle and coupled to the motor. The trigger is configured to control operation of the motor in response to an input provided by an operator of the power tool by coupling the motor to a source of power. The transmission couples the motor and the output member. The housing includes a gear case, which houses at least a portion of the transmission, and a handle housing, which houses the motor. A plurality of features is formed onto the handle housing and the gear case to align the two to a common rotary axis. The features can comprise mating frusto-conically shaped surfaces.

In another form, the present teachings provide a power tool having a housing, a motor received in the housing, a trigger, an output member and a transmission. The housing defines a handle. The trigger is mounted to the handle and coupled to the motor. The trigger is adapted to control operation of the motor in response to an input provided by an operator of the power tool by coupling the motor to a source of power. The multi-speed transmission couples the motor the motor and the output member and comprises a planetary stage with a planet carrier, a plurality of planet gears, a first ring gear and a second ring gear. The planet carrier has a carrier body and a plurality of pins that are fixed to the carrier body. Each of the compound planetary gears is rotatably mounted on an associated one of the pins. Each of the compound planetary gears has a first planet gear, which is meshingly engaged to the first ring gear, and a second planet gear that is meshingly engaged to the second ring gear and coupled to the first planet gear for common rotation. The pins are spaced circumferentially about the carrier body such that each pair of adjacent pins is spaced apart by a spacing angle. At least two different spacing angles are employed to space the pins about the carrier body.

In still another form, the present teachings provide a power tool having a housing, a motor received in the housing, a trigger, an output member and a transmission. The housing defines a handle. The trigger is mounted to the handle and coupled to the motor. The trigger is adapted to control operation of the motor in response to an input provided by an operator of the power tool by coupling the motor to a source of power. The transmission couples the motor and the output member and comprises a planetary stage with a planet carrier, a plurality of planet gears, and a ring gear, the planet carrier having a carrier body and a plurality of pins that are fixed to the carrier body, each of the planet gears being rotatably mounted on associated one of the pins, wherein the pins are spaced circumferentially about the carrier body such that each pair of adjacent pins is spaced apart by a spacing angle, and wherein at least two different spacing angles are employed to space the pins about the carrier body.

In a further form, the present teachings provide a power tool that includes a housing assembly and a drive component. The housing assembly has a first housing component, a second housing component, at least one set of mating conically-shaped features, and at least one fastener. Each set of mating conically-shaped features includes a first cone portion and a second cone portion. The first cone portion of each set of mating conically-shaped features is coupled to the first housing component and has a frusto-conically-shaped exterior surface, while the second cone portion of each set of mating conically-shaped features is coupled to the second housing component and has a frusto-conically-shaped interior surface that is engaged with the frusto-conically-shaped exterior surface of an associated first cone portion. Each fastener is received through an associated pair of the first and second cone portions and is threadably engaged to one of the first and second housing components. The drive component is housed in the housing assembly and includes at least one of a motor, a transmission and a clutch.

In still another form, the present teachings provide a power tool having a motor, an output spindle, a transmission that is configured to transmit power between the motor and the output spindle, and a housing assembly into which the motor, the output spindle and the transmission are received. The housing assembly has a first housing component, a second housing component and a plurality of threaded fasteners. The first housing component has a plurality of first cone portions and a first axial end face, while the second housing component has a plurality of second cone portions and a second axial end face. Each of the threaded fasteners is received through an associated pair of the first and second cone portions and applies a clamping force that maintains the first and second axial end faces in abutment with one another. The first and second cone portions are configured to orient the first and second housing components to a common axis.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Overview

Figure 1:
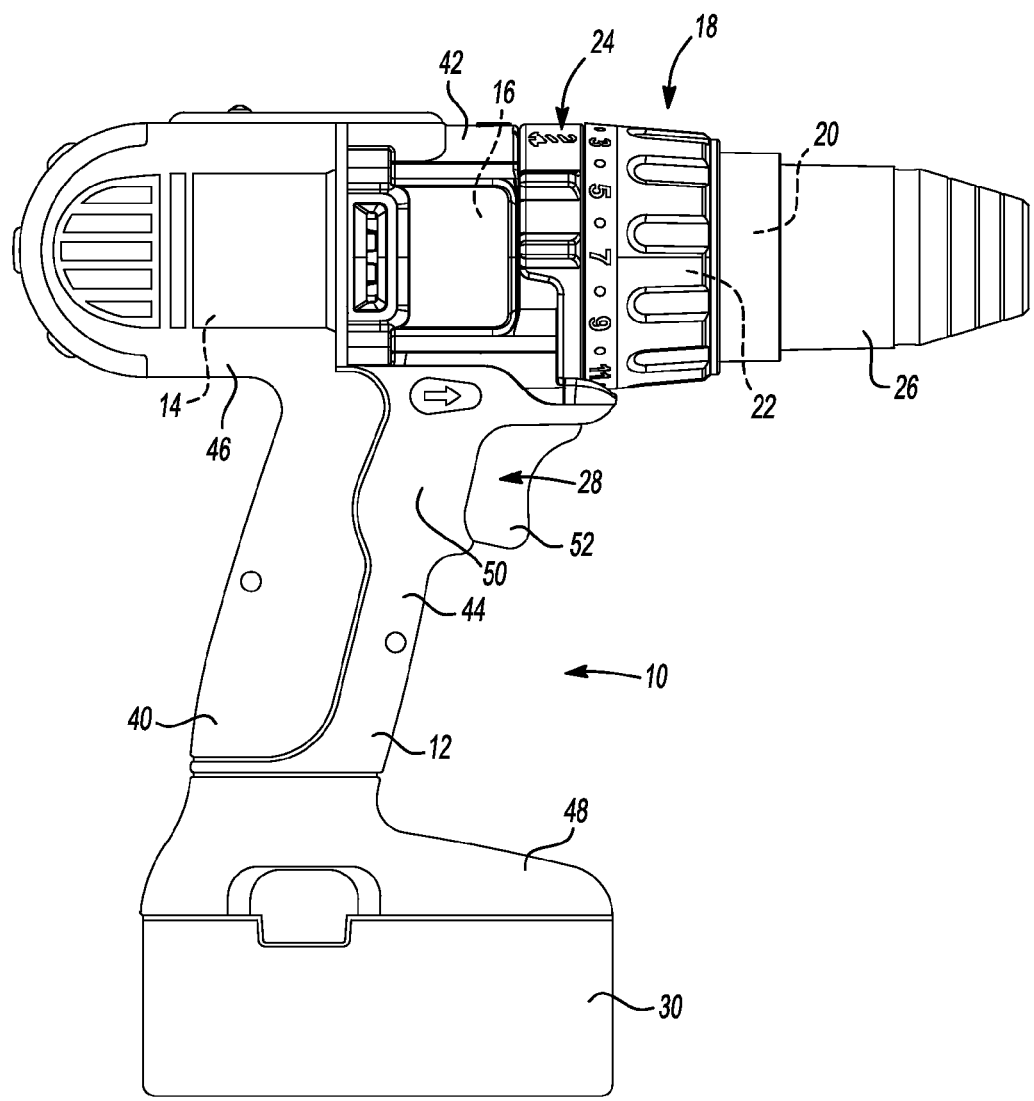
FIG. 1 is a side elevation view of an exemplary power tool constructed in accordance with the teachings of the present disclosure.
Figure 2:
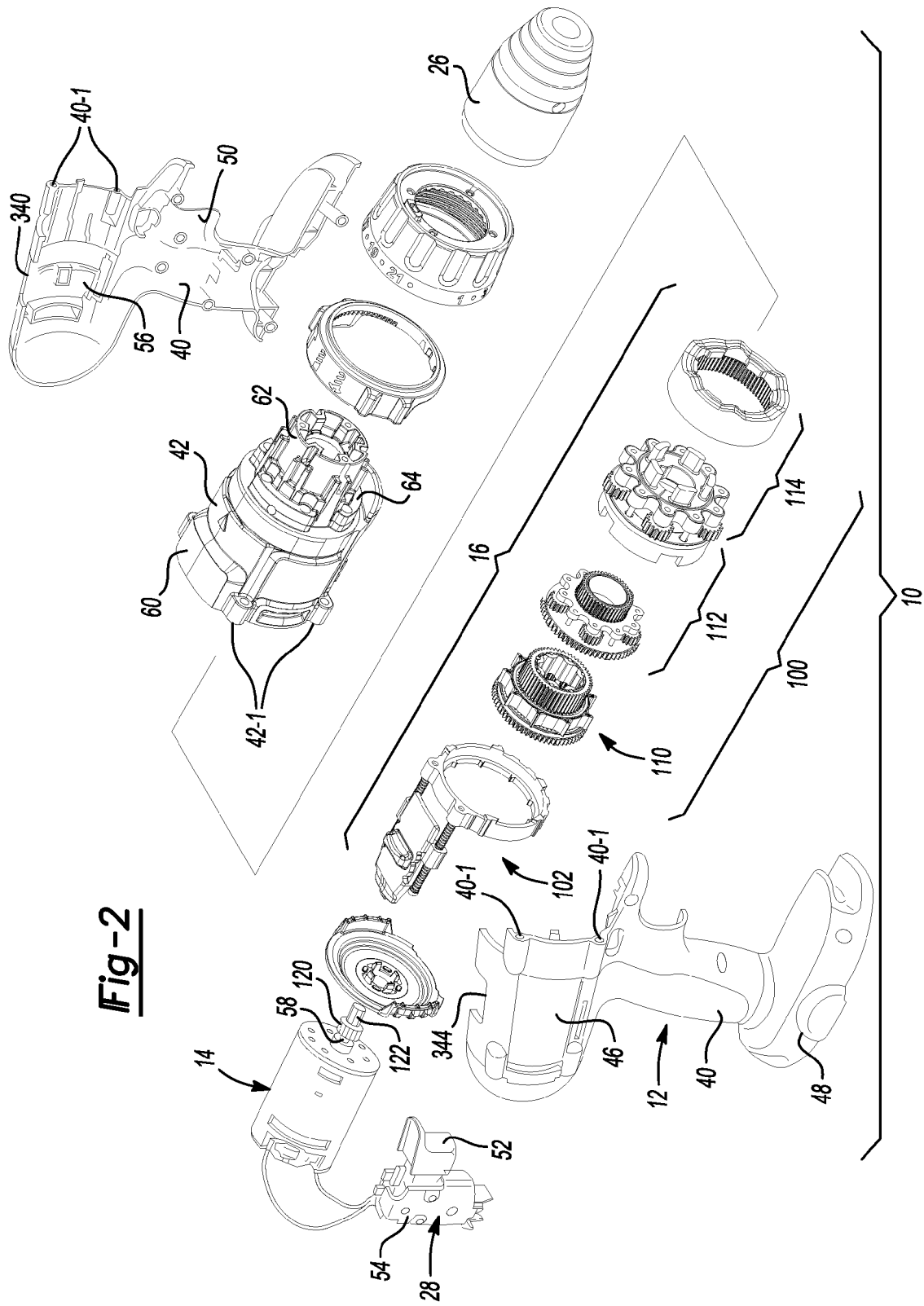
FIG. 2 is an exploded perspective view of a portion of the power tool of FIG. 1.

With reference to FIGS. 1 and 2 of the drawings, a power tool constructed in accordance with the teachings of the present disclosure is generally indicated by reference numeral 10. As those skilled in the art will appreciate, such power tool 10 may be either a corded or cordless (battery operated) device, such as a portable screwdriver, drill/driver, hammer drill/driver or rotary hammer, for example. In the particular embodiment illustrated, power tool 10 is a cordless hammer drill/driver having a housing 12, a motor assembly 14, a multi-speed transmission assembly 16, a clutch mechanism 18, an output spindle 20 (FIG. 8), a hammer mechanism 22, a mode change mechanism 24, a chuck 26, a trigger assembly 28 and a battery pack 30.

The housing 12 can include a pair of mating housing shells 40 and a gear case 42. The housing shells 40 can cooperate to define a handle portion 44 and a body portion 46. The handle portion 44 can include a battery pack mount 48, to which the battery pack 30 can be removably coupled, and a switch mount 50. The trigger assembly 28, which can include a trigger 52 and a trigger switch 54, and be coupled to the switch mount 50. The body portion 46 can define a motor cavity 56. The motor assembly 14, which can include a rotatable output shaft 58, can be received in the motor cavity 56. The gear case 42 can include a rear case portion 60, a front case portion 62 and an annular wall member 64 that can couple the rear and front case portions 60 and 62 to one another. The rear case portion 60 can be removably coupled to the housing shells 40 via a plurality of fasteners (not specifically shown) to close a front end of the body portion 46.

Figure 26:
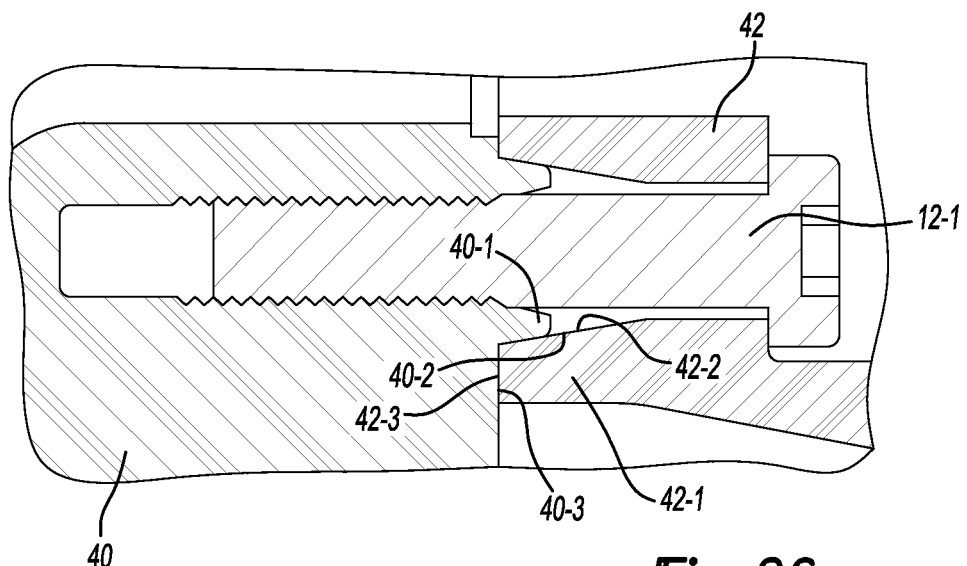
FIG. 26 is a section view of a portion of the tool of FIG. 1, illustrating portions of the housing and the gear case.

With reference to FIGS. 2 and 26, the housing shells 40 and the gear case 42 having mating conically shaped features in the example provided that aid in controlling alignment of the gear case 42 relative to the housing shells 40 such that the motor assembly 14 and the transmission assembly 16 are aligned along a common rotational axis. The mating conically shaped features can comprise first and second cone portions 40-1 and 42-1 and can be located in two or more locations along the interface between the housing shells 40 and the gear case 42. In the example provided, mating conically shaped features are incorporated into four bosses that are employed to receive threaded fasteners 12-1 that fixedly but removably couple the housing shells 40 to the gear case 42. The first cone portion 40-1 can define a first frusto-conical surface 40-2 that can be received against a corresponding second frusto-conical surface 42-2 that is formed into or onto the gear case 42. It will be appreciated that while the first frusto-conical surface 40-2 is illustrated as being a male surface and the second frusto-conical surface 42-2 is illustrated as being a female surface, those of skill in the art will appreciate that the first frusto-conical surface 40-2 could be a female surface and that the second frusto-conical surface 42-2 could be a male surface in the alternative. The first and second cone portions 40-1 and 42-1 can be employed to locate the gear case 42 relative to the housing shells 40 in two directions that are perpendicular to the common rotational axis, as well as radially about the common rotational axis. The threaded fasteners 12-1 can be received in each of the bosses and threadably engaged to the housing shells 40 to generate a clamping force that causes an axial end face 42-3 of the gear case 42 to abut an axial end face 40-3 of the housing shells 40. In some situations, the axial end face 42-3 of the gear case 42 can be spaced apart from the axial end face 40-3 of the housing shells 40 when the first and second cone portions 40-1 and 42-1 are abutted against one another. It is expected, however, that the clamp load generated by the threaded fasteners 12-1 can deform the first cone portions 40-1 somewhat so that the axial end faces 40-3 and 42-3 can abut one another.

The transmission assembly 16 can be received between the motor assembly 14 and the gear case 42 and can transmit rotary power between the output shaft 58 of the motor assembly 14 and the output spindle 20 (FIG. 8), which can be supported for rotation in the gear case 42. The clutch mechanism 18 can be employed to selectively limit the torque that is transmitted through the transmission assembly 16 to the output spindle 20. The hammer mechanism 22 can be coupled to the gear case 42 and the output spindle 20 and can be selectively employed to produce an axially reciprocating motion to the output spindle 20 when the power tool 10 is operated. The mode change mechanism 24 can be coupled to the housing 12, the clutch mechanism 18 and the hammer mechanism 22 to selectively control the operation of the hammer mechanism 22 and/or to selectively lock-out or bypass the clutch mechanism 18. The chuck 26 can be coupled to an end of the output spindle 20 opposite the transmission assembly 16.

Those of skill in the art will appreciate that various components of the power tool 10, such as the motor assembly 14, the chuck 26, the trigger assembly 28 and the battery pack 30, can be conventional in their construction and operation and as such, need not be discussed in significant detail herein. Reference may be made to a variety of publications for a more complete understanding of the construction and operation of the conventional components of the power tool 10, including U.S. Pat. Nos. 6,431,289; 7,314,097; 5704,433; and RE37, 905, the disclosures of which are hereby incorporated by reference as if fully set forth in detail herein.

Transmission Assembly

Figure 3:
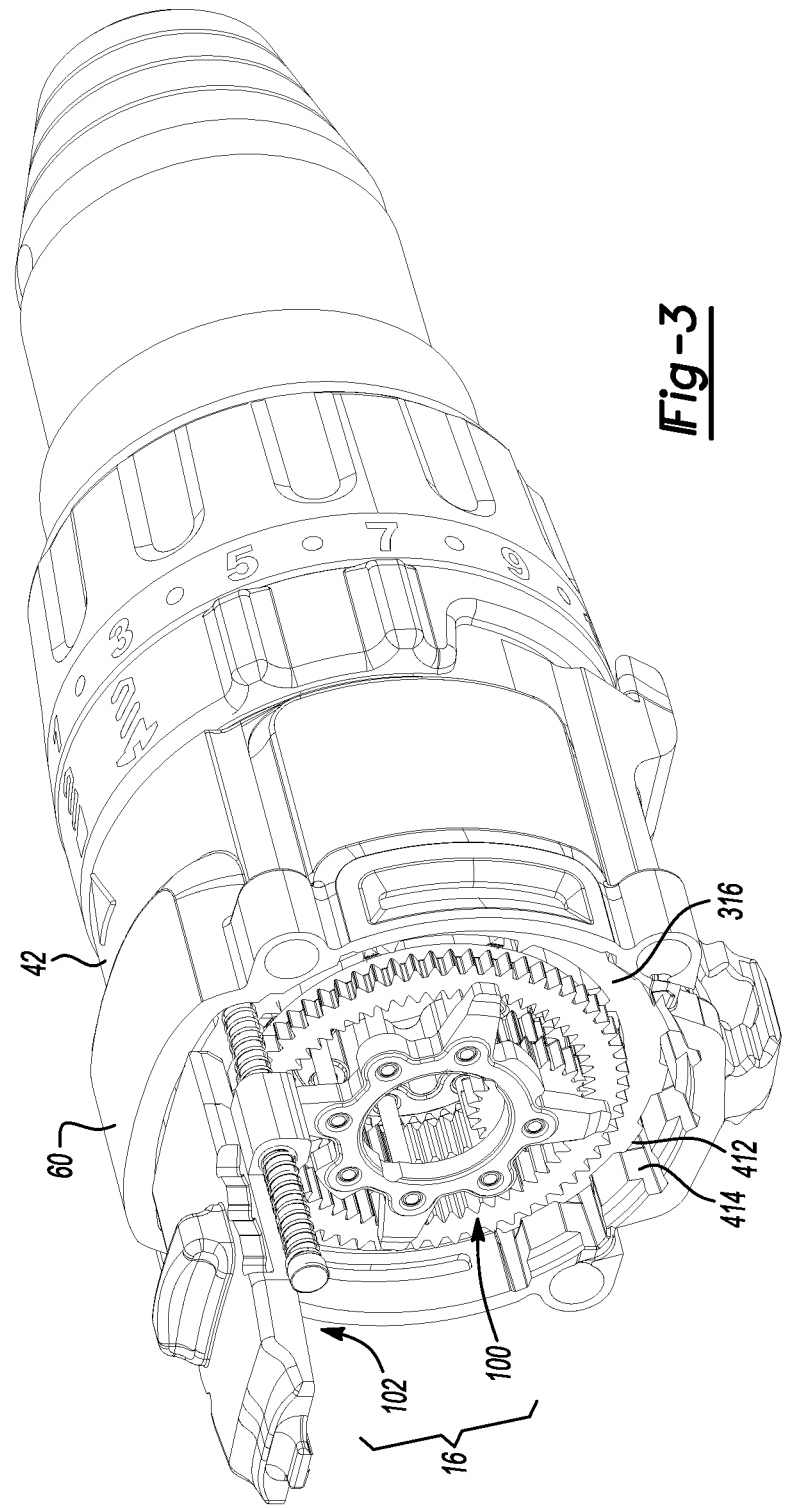
FIG. 3 is a perspective view of a portion of the power tool of FIG. 1 illustrating the gear case and transmission assembly in more detail.

With reference to FIGS. 2 and 3, the transmission assembly 16 can include a multi-speed transmission, such as a reduction gearset assembly 100, and a switching mechanism, such as a speed selector 102. The reduction gearset assembly 100 can be received in the rear case portion 60 of the gear case 42 and can be a multi-stage planetary transmission that can include an input stage 110, an intermediate stage 112, and an output stage 114.

Figure 4:
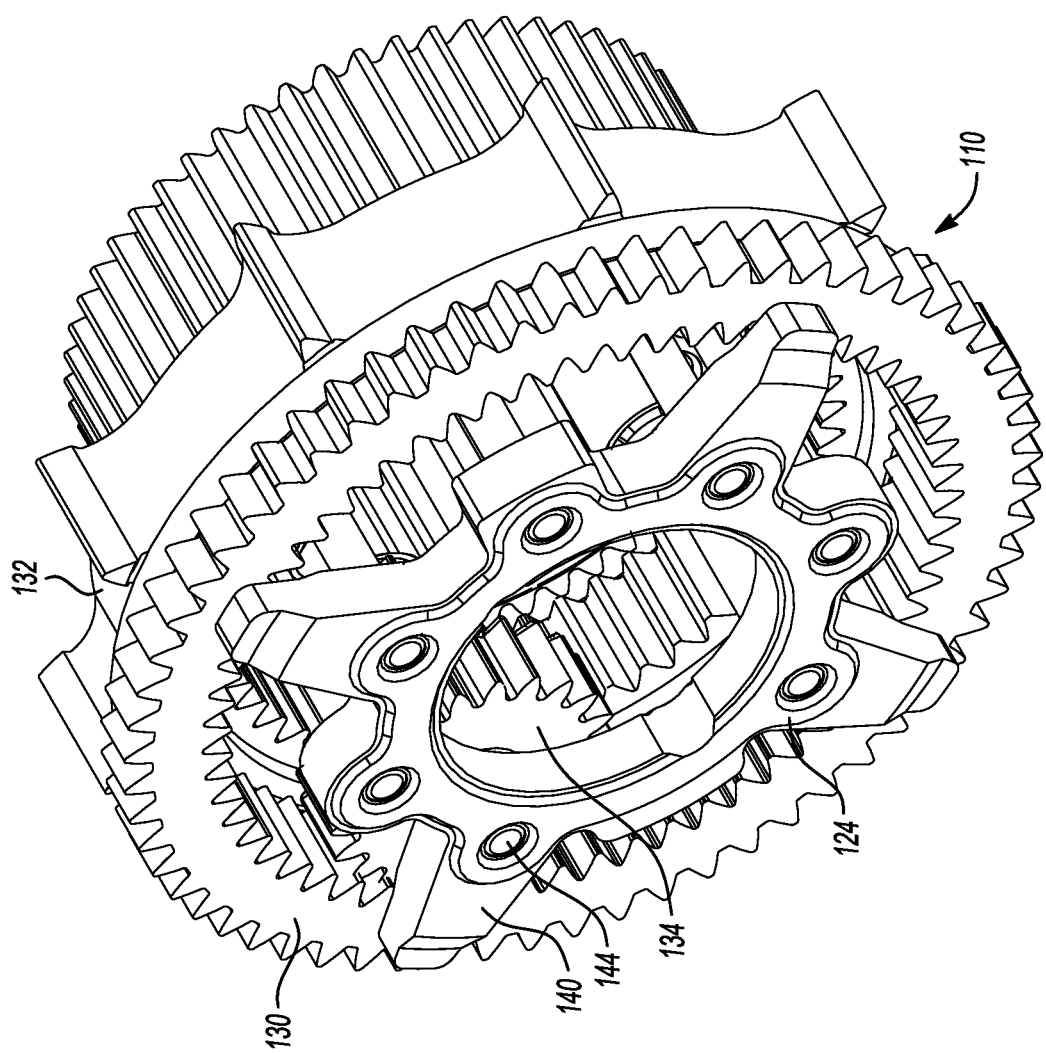
FIG. 4 is a perspective view of a portion of the transmission assembly illustrating the input stage in more detail.
Figure 5:
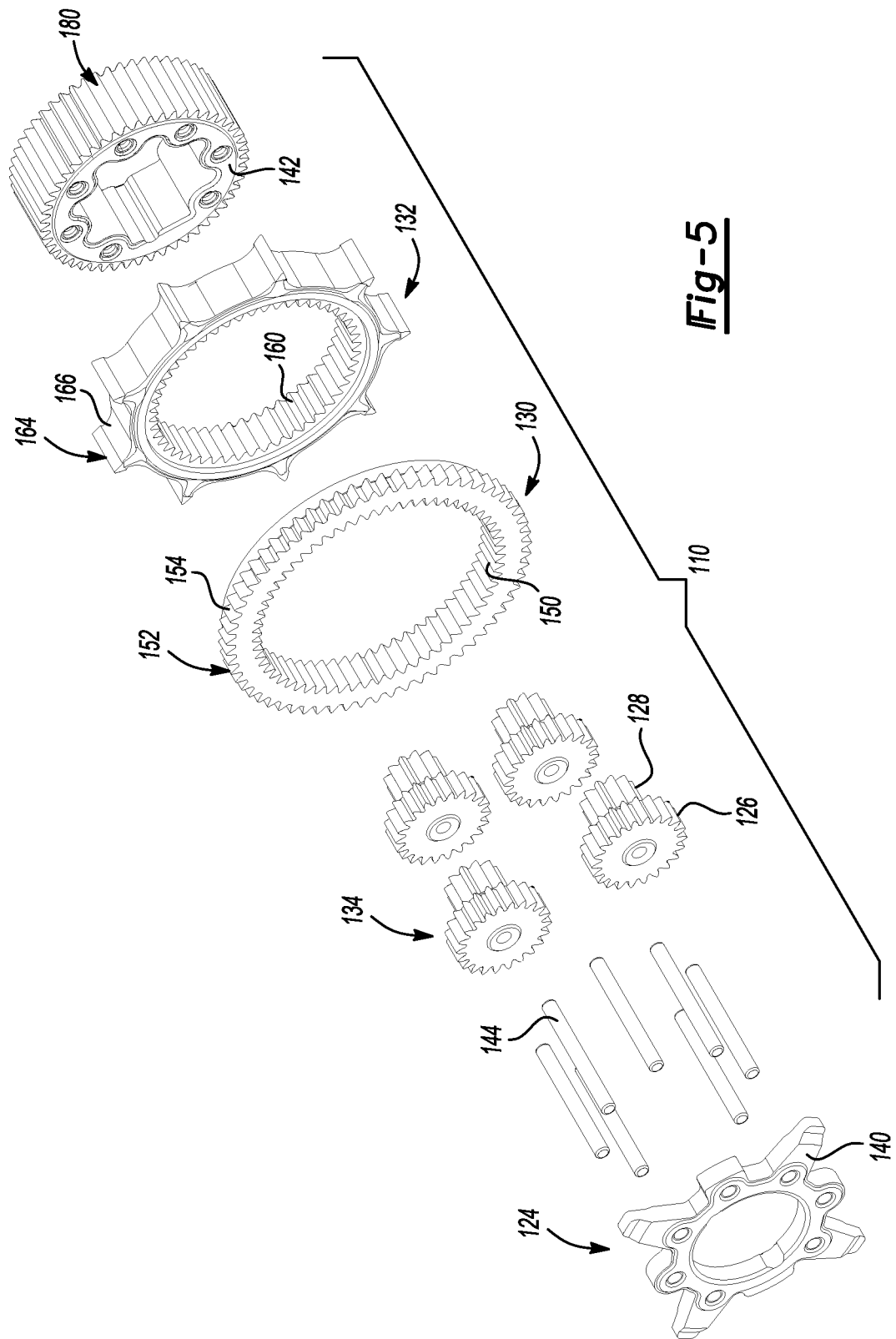
FIG. 5 is an exploded perspective view of the input stage of the transmission assembly.

With reference to FIGS. 1, 4 and 5, the input stage 110 can include a first input sun gear 120, a second input sun gear 122, an input reduction carrier 124, a first set of input planetary gears 126, a second set of input planetary gears 128, a first input ring gear 130 and a second input ring gear 132. The first and second input sun gears 120 and 122 can be unitarily formed and can be coupled for rotation with the output shaft 58 of the motor assembly 14. The first input sun gear 120 can be meshingly engaged with the planetary gears of the first set of input planetary gears 126, while the second input sun gear 122 can be meshingly engaged with the planetary gears of the second set of input planetary gears 128. In the particular example provided, the planetary gears of the first and second sets of input planetary gears 126 and 128 are unitarily formed (i.e., each of the planetary gears of the first set of input planetary gears 126 is integrally formed with an associated one of the planetary gears of the second set of input planetary gears 128) and will be referred to herein as a compound planet gear 134. Those of skill in the art will appreciate from this disclosure, however, that the planetary gears of the first and second sets of planetary gears 126 and 128 can be separately formed. The input reduction carrier 124 can include a first plate member 140, a second plate member 142 and a plurality of pins or shafts 144 that extend between and couple the first and second plate members 140 and 142 to one another. Each of the compound planetary gears 134 can be journally supported on an associated one of the shafts 144. In the example provided, the quantity of the shafts 144 is greater than the quantity of the compound planetary gears 134 and the "extra" shafts 144 are employed to better secure the first and second plate members 140 and 142 to one another. The first input ring gear 130 can include a first set of internal teeth 150, which can be meshingly engaged to the planetary gears of the first set of input planetary gears 126, and a first external engagement feature 152, such as a first set of external teeth 154 that can be disposed about the outer diametrical surface of the first input ring gear 130. Similarly, the second input ring gear 132 can include a second set of internal teeth 160, which can be meshingly engaged to the planetary gears of the second set of input planetary gears 128 and a second external engagement feature 164, such as a second set of external teeth 166 that can be disposed about an outer diametrical surface of the second input ring gear 132. In the particular example provided, the quantity of teeth in the second set of external teeth 166 is significantly less than the number of teeth in the first set of external teeth 154 as the second set of external teeth 166 will carry less load (as will be apparent from the discussion, below).

Figure 6:
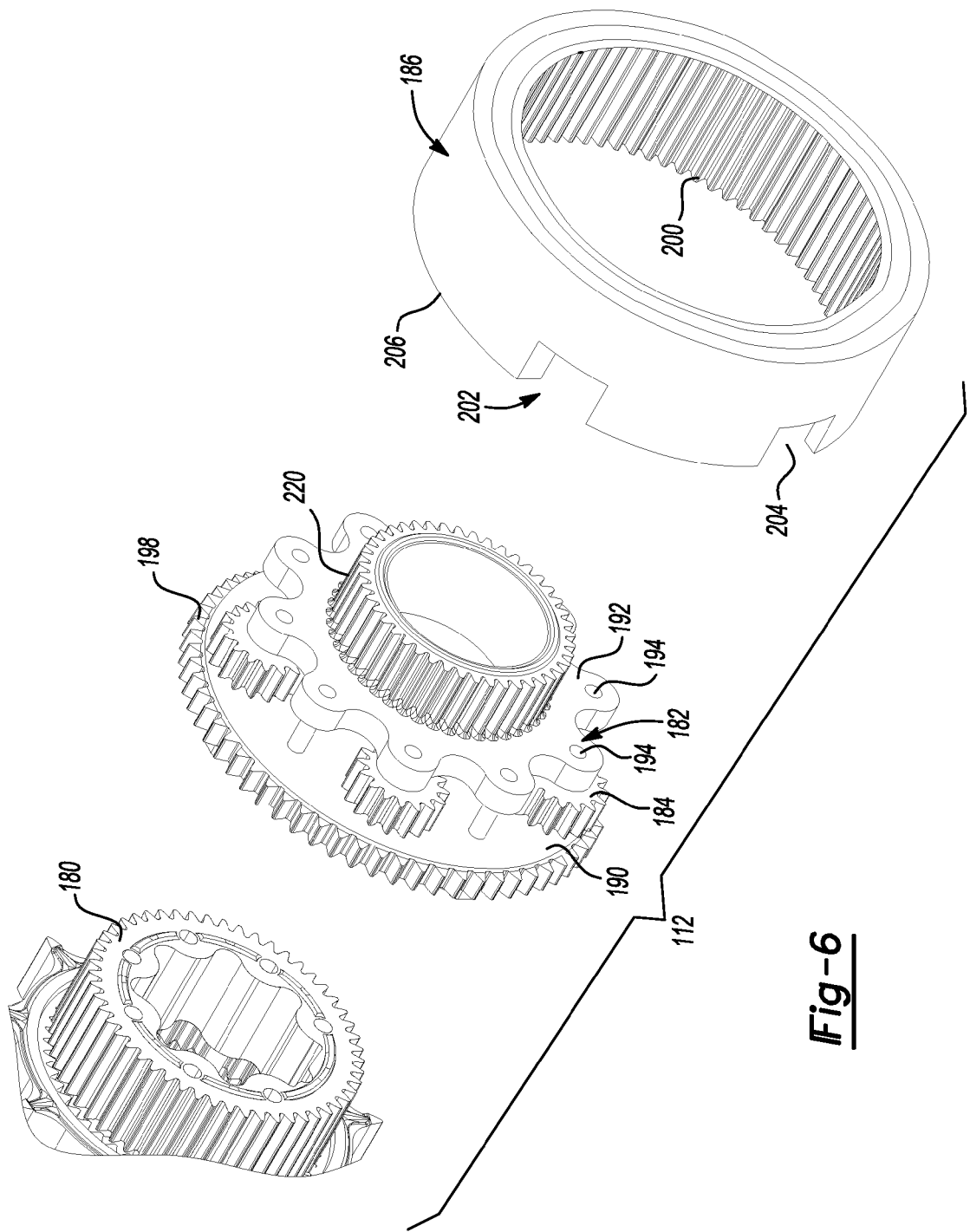
FIG. 6 is an exploded perspective view of the intermediate stage of the transmission assembly.

With reference to FIGS. 5 and 6, the intermediate stage 112 can include an intermediate sun gear 180, an intermediate reduction carrier 182, a set of intermediate planetary gears 184 and an intermediate ring gear 186. The intermediate sun gear 180 can be fixedly coupled to the input reduction carrier 124 for rotation therewith. In the example provided, the intermediate sun gear 180 is integrally formed with the first plate member 140. The planetary gears of the set of intermediate planetary gears 184 can be meshingly engaged with the intermediate sun gear 180 and the intermediate ring gear 186. The intermediate reduction carrier 182 can include a first plate member 190, a second plate member 192 and a plurality of pins or shafts 194 that extend between and couple the first and second plate members 190 and 192 to one another. Each of the planetary gears of the set of intermediate planetary gears 184 can be journally supported on an associated one of the shafts 194. In the example provided, the quantity of the shafts 194 is greater than the quantity of the planetary gears of the set of intermediate planetary gears 184 and the "extra" shafts 194 are employed to better secure the first and second plate members 190 and 192 to one another. A third set of external teeth 198 can be formed about the outer diameter of the first plate member 190 of the intermediate reduction carrier 182. The intermediate ring gear 186 can include a third set of internal teeth 200, which can be meshingly engaged to the planetary gears of the set of intermediate planetary gears 184, and a third external engagement feature 202, such as a fourth set of external teeth 204 that can be disposed about the rear axial surface 206 of the intermediate ring gear 186.

Figure 7:
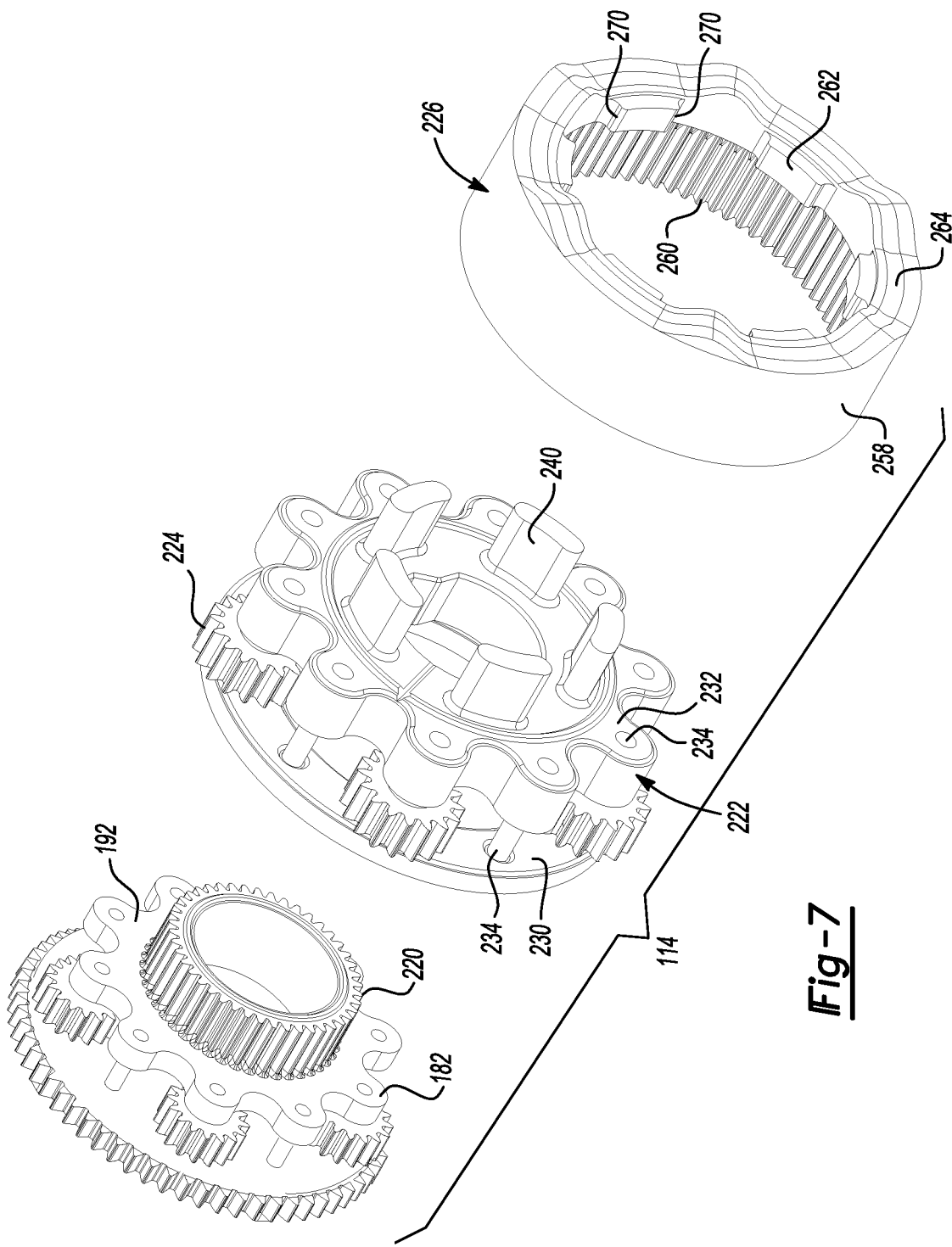
FIG. 7 is an exploded perspective view of an output stage of the transmission assembly.

With reference to FIG. 7, the output stage 114 can include an output sun gear 220, an output reduction carrier 222, a set of output planetary gears 224 and an output ring gear 226. The output sun gear 220 can be fixedly coupled to the intermediate reduction carrier 182 for rotation therewith. In the example provided, the output sun gear 220 is integrally formed with the second plate member 192 of the intermediate reduction carrier 182. The planetary gears of the set of output planetary gears 224 can be meshingly engaged with the output sun gear 220 and the output ring gear 226. The output reduction carrier 222 can include a first plate member 230, a second plate member 232 and a plurality of pins or shafts 234 that extend between and couple the first and second plate members 230 and 232 to one another. Each of the planetary gears of the set of output planetary gears 224 can be journally supported on an associated one of the shafts 234. In the example provided, the quantity of the shafts 234 is greater than the quantity of the planetary gears of the set of output planetary gears 224 and the "extra" shafts 234 are employed to better secure the first and second plate members 230 and 232 to one another.

Figure 8:
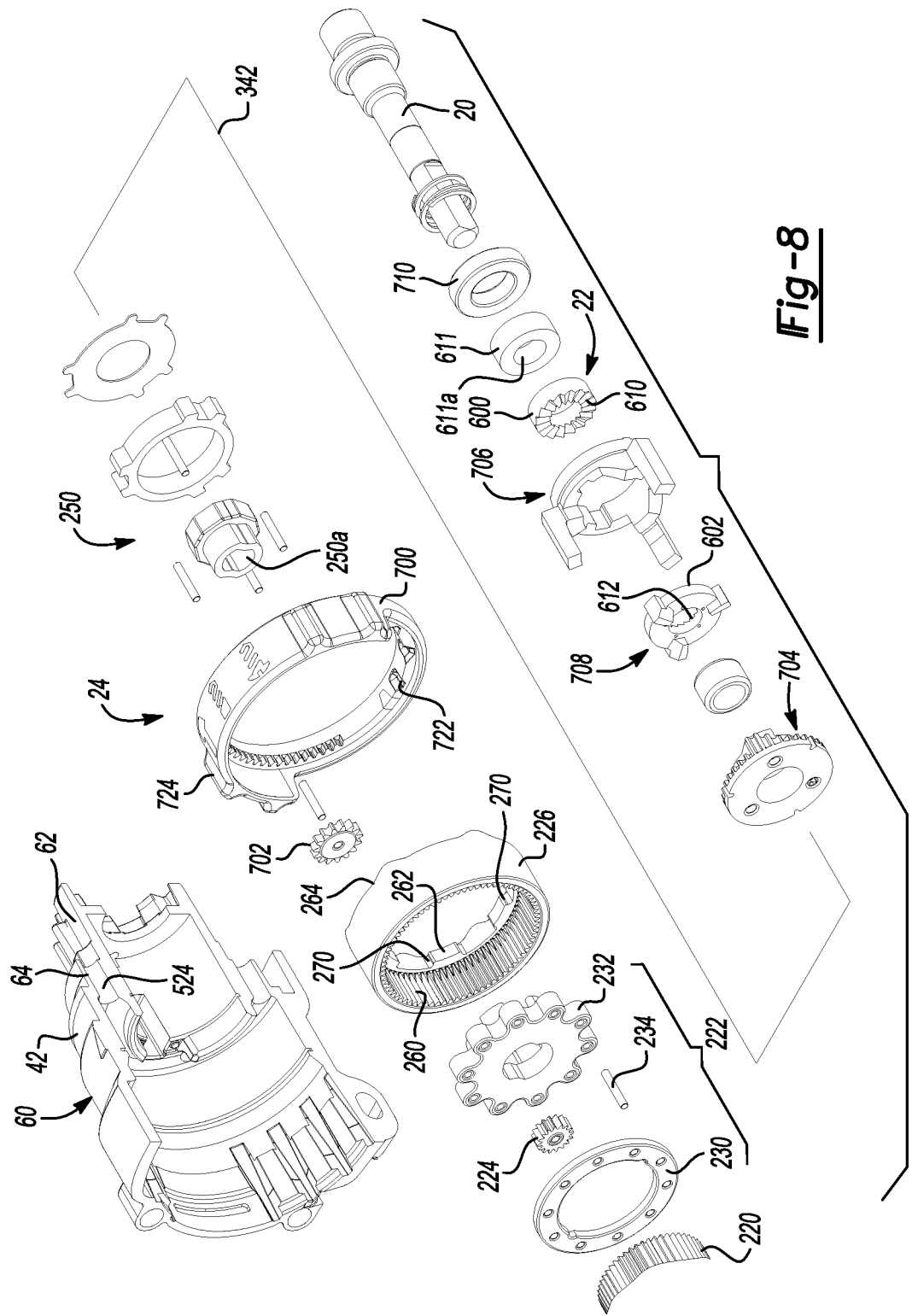
FIG. 8 is an exploded perspective view of a portion of the power tool of FIG. 1 illustrating portions of a clutch mechanism, a hammer mechanism and a mode change mechanism in more detail.

With additional reference to FIG. 8, the output spindle 20 can be coupled to the output reduction carrier 222 to transmit rotary power therebetween. The output ring gear 226 can include an annular body 258, a fourth set of internal teeth 260, a plurality of clutch bypass lugs 262 and a clutch profile 264 that will be described in more detail, below. The fourth set of internal teeth 260 can be formed about the inside diameter of the annular body 258 and can be meshingly engaged to the planetary gears of the set of output planetary gears 224. The clutch bypass lugs 262 can extend radially inwardly from the annular body 258 and can be circumferentially spaced apart around the annular body 258. The clutch bypass lugs 262 can include confronting surfaces 270 that will be discussed in more detail, below.

A spindle lock 250 can be disposed between the output reduction carrier 222 and the output spindle 20 to lock the output spindle 20 against rotation when torque is applied to the output spindle 20 from the chuck 26 (FIG. 1) (i.e., as when the chuck 26 (FIG. 1) is being hand tightened). The general construction of spindle locks are well known in the art and as such, a detailed discussion of a spindle lock need not be provided herein. In the particular example provided, the spindle lock 250 comprises a spindle lock bushing 250-1 having a stem 250-2 that extends rearwardly from a head 250-3. The stem 250-2 is configured to engage the second plate member 232 of the output reduction carrier 222 in a slip-fit manner that permits limited relative rotation therebetween. Similarly, the output shaft 20 can comprise a shaft end 20-1 that can engage the spindle lock bushing 250-1 in a slip-fit manner that permits limited relative rotation therebetween. A mating male-female configuration can be employed between the stem 250-2 and an aperture in the second plate member 232, as well as between an aperture in the spindle lock bushing 250-1 and the end 20-1 of the output spindle 20. In each instance, the aperture can be shaped with two sets of generally V-shaped sidewalls VS1 (FIG. 17) with each set being disposed opposite the other such that the peaks of the sets point toward one another, while the male portion inserted thereto can have corresponding V-shaped sidewalls VS2. It will be appreciated that the degree of relative rotation between the male and female portions (i.e., the stem 250-2 and an aperture in the second plate member 232, and the aperture in the spindle lock bushing 250-1 and the end 20-1 of the output spindle 20) can be configured based upon differences in the interior angle between the sets of the V-shaped sidewalls. For example, each set of V-shaped sidewalls in a female feature (i.e., V-shaped sidewalls VS1) can be configured with a first interior angle, while each set of V-shaped sidewalls in a male feature (i.e., V-shaped sidewalls VS2) can be configured with a second, smaller interior angle. Configuration in this manner permits the spindle lock 250 and output spindle 20 to have a desired degree of rotational backlash that is relatively easy to maintain in high volume production without excessive cost.

Returning to FIG. 5, the second plate member 142 of the input reduction carrier 124 is not a discrete component but rather is the intermediate sun gear 180 in the particular example provided. As such, the input reduction carrier 124 does not include a flange that extends radially outwardly of an associated sun gear as in the transmission that is described in the '289 patent. Stated another way, the intermediate sun gear 1870 has an outer diameter onto which a plurality of sun gear teeth are formed and the pins 144 of the input reduction carrier 182 are coupled to the intermediate sun gear 180 radially inwardly of the sun gear teeth such that no portion of the intermediate sun gear 180 that transmits torque during operation of the reduction gearset assembly 100 (FIG. 2) is bigger in diameter than the outside diameter of the intermediate sun gear 180 as measured across the peaks of the sun gear teeth. Consequently, the pins 144 that support the planetary gears of the first and second sets of input planetary gears 126 and 128 can be directly coupled to an axial end face of the intermediate sun gear 180 and one or both of the planetary gears associated with the first and second sets of input planetary gears 126 and 128 can have a pitch diameter that is smaller in diameter than a pitch diameter of the intermediate sun gear 180.

While the planetary gears of the sets of first and second input planetary gears 126 and 128 can have any desired number of teeth, it may be desirable in some instance to configure the planetary gears of the set of first input planetary gears 126 such that the quantity n1 of their teeth is a multiple of the quantity n2 of the teeth of the planetary gears of the set of second input planetary gears 128. In this regard a ratio of the quantity n1 to the quantity n2 can yield an integer (e.g., 2, 3). This can be desirable as it can eliminate the need to time the planetary gears to one or more other geared elements of the input stage 110 (or any other portion of the reduction gearset assembly 100 (FIG. 2)), as well as permit the compound planetary gears 134 to be identically formed (i.e., such that the planetary gears of the sets of first and second input planetary gears 126 and 128 are maintained in the same relative rotational orientation to one another). As will be appreciated, timing of gears involves the positioning of two or more of the gears into a predetermined rotational position relative to one another to permit engagement between predetermined teeth.

We have noted that in some situations, the space between the teeth of the planetary gears of the first set of input planetary gears 126 and the first input ring gear 130 and/or the teeth of the planetary gears of the second set of input planetary gears 128 and the second input ring gear 132 that results from factors including intended clearance, tolerances and backlash can be sufficiently large so as to permit one or more of the planetary gears of the sets of first and second input planetary gears 126 and 128 to be aligned one tooth out of phase with its associated ring gear (i.e., the first and second input ring gears 130 and 132, respectively). While assembly fixtures could be employed to reduce or eliminate the possibility that the input stage 110 could be misassembled, we discovered that it is also possible to make a slight alteration to the input stage 110 to shift the compound planetary gears 134 in the manner that will be described in detail below so that misassembly of the input stage would not be possible.

Figure 9:
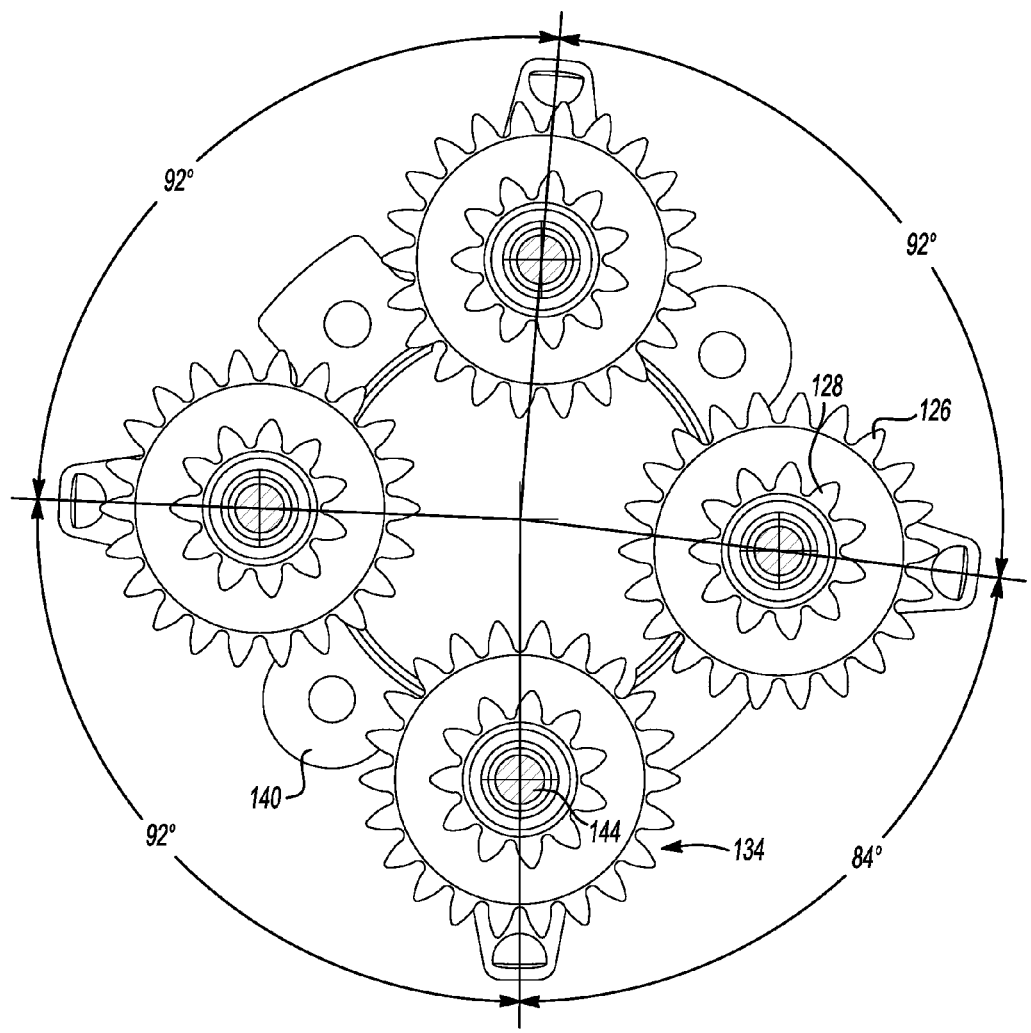
FIG. 9 is an elevation view of a portion of the input stage illustrating the spacing of the compound planetary gears.

With reference to FIGS. 5 and 9, the compound planetary gears 134 (i.e., the planetary gears of the first and second sets of input planetary gears 126 and 128) can be distributed or circumferentially spaced apart in any desired manner. While an even spacing can be employed in some situations, an uneven spacing (i.e., as measured between shafts 144 onto which a compound planet gear 134 is received) was employed in the particular example provided to reduce gear mesh noise that can be produced when rotary power is transmitted through the reduction gearset assembly 100 and to render it more difficult to misassemble the input stage 110 of the reduction gearset assembly 100. As used herein, the term "uneven spacing" is employed to refer to situations in which two or more angular spacings are employed between adjacent planet gears in a planetary stage. Accordingly, it will be appreciated that when uneven spacing is employed, at least one of the angular spacings will be equal to a first angular dimension and at least one angular spacing will be equal to a second angular dimension that is not equal to the first angular dimension. It will also be appreciated that other angular spacings (e.g., a third angular spacing) could also be employed. In the specific example provided, the four shafts 144 of the input reduction carrier 124 on which the compound planetary gears 134 are mounted are spaced apart in the example provided by spacings of 92 degrees, 92 degrees, 92 degrees and 84 degrees. Those of skill in the art will appreciate that other spacings could be employed and as such, the scope of the present disclosure will not be understood to be limited to the particular spacing or combination of spacings that are disclosed in the particular example provided.

Returning to FIG. 3, as the transmission assembly 16 does not employ a sleeve that is received between an exterior housing and a reduction gearset assembly (such a configuration is described in the '289 patent), the overall diameter of portions of the reduction gearset assembly 100, including the sets of first and second input planetary gears 126 and 128 (FIG. 5), the set of intermediate planetary gears 184 (FIG. 6) and the set of output planetary gears 224 (FIG. 7), to be sized relatively larger in diameter without increasing the overall diameter of the power tool. As a result of the increased diameter of the components of the reduction gearset assembly 100, corresponding decreases are achieved in the torque applied to the various planetary gears as well as in the load borne by the teeth of the various planetary gears. Consequently, it was possible to reduce the overall length of the planetary gears of the reduction gearset assembly 100 to shorten the overall length of the reduction gearset assembly 100 relative to the transmission described in the '289 patent by about 15 mm. It is within the scope of the present disclosure, however, to employ a sleeve between the reduction gearset assembly 100 and the exterior housing.

Due in part to the enlarged diameter of the reduction gearset assembly 100 and the shortened length of the planetary gears of the reduction gearset assembly 100, it was possible to enhance the efficiency of the reduction gearset assembly 100 through a reduction in the diameter of the pins 144 (FIG. 5), 194 (FIG. 6) and 234 (FIG. 7) of the various reduction carriers 124 (FIG. 5), 182 (FIG. 6) and 222 (FIG. 7). In the particular example provided, the pins 144 (FIG. 5), 194 (FIG. 6) and 234 (FIG. 7) have a diameter of about 2.0 mm.

Figure 10:
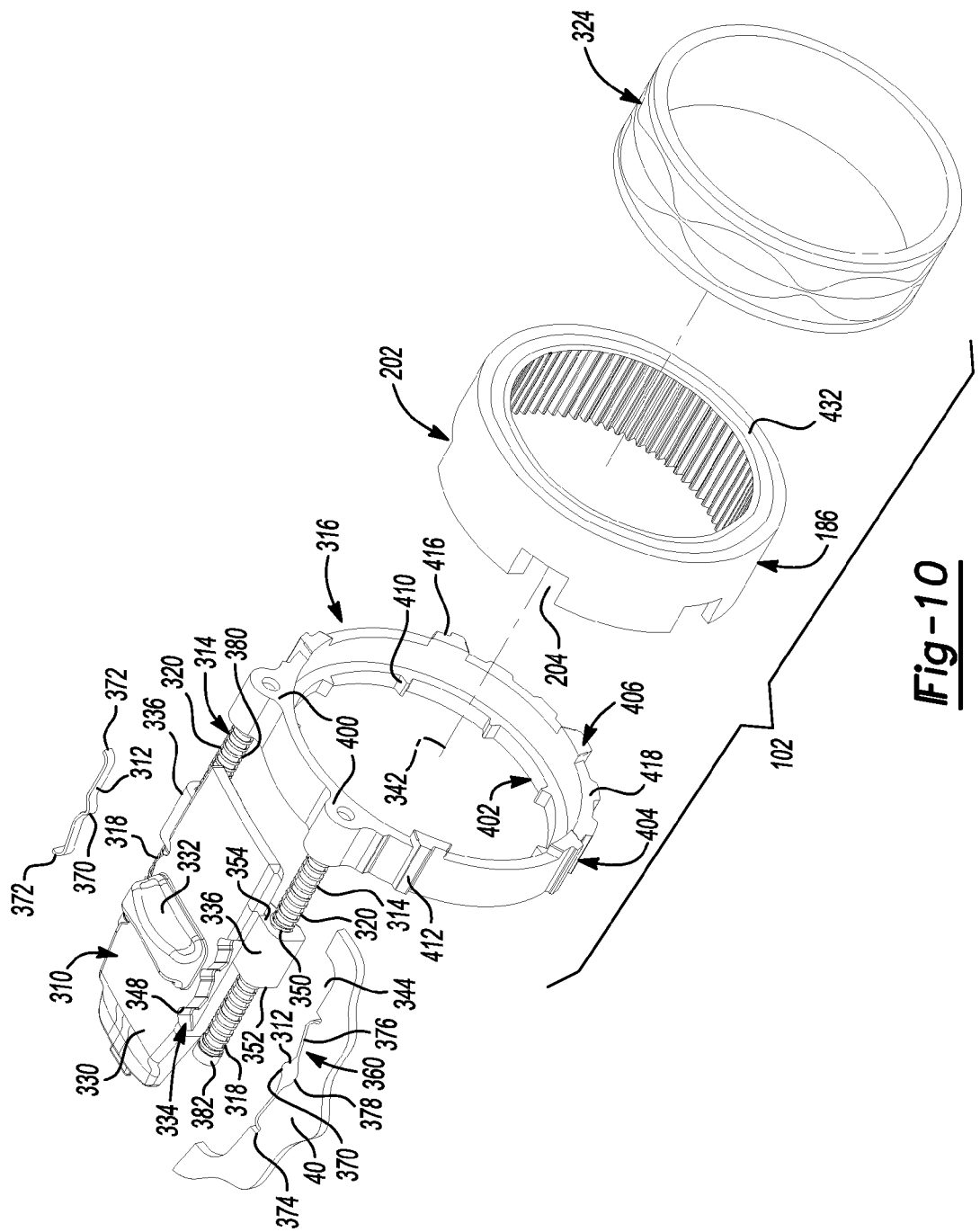
FIG. 10 is an exploded perspective view of a portion of the power tool of FIG. 1 illustrating the speed selector in more detail.

Returning to FIG. 10, the speed selector 102 can include a switch assembly 300 and an actuator assembly 302. The switch assembly 300 can include a switch 310; and a pair of first detent members 312, while the actuator assembly 302 can include a pair of rails 314; an actuator, such as a collar 316; and first, second and third biasing springs 318, 320 and 324, respectively.

The switch 310 can include a plate structure 330, a switch member 332, a pair of second detent members 334 and a pair of bushings 336. The plate structure 330 can be received in pair of slots 340 (FIG. 1) formed into the housing shells 40 generally parallel to a longitudinal axis 342 of the reduction gearset assembly 100 (FIG. 2). The switch member 332 can be coupled to the plate structure 330 and can extend through a switch aperture 344 that can be defined by the housing shells 40. The switch member 332 can be configured to receive a manual input from an operator of the power tool 10 (FIG. 1) to move the switch 310 between a first position, a second position and a third position. Indicia (not specifically shown) may be marked or formed on one or both of the housing shells 40 or the plate structure 330 to indicate a position into which the switch 310 is located. The second detent members 334 can cooperate with the first detent members 312 to resist movement of the switch 310. In the example provided, the second detent members 334 comprise a plurality of detent recesses 348 that are formed in the plate structure 330. The bushings 336 can be coupled to the opposite lateral sides of the plate structure 330 and can include a bushing aperture 350 and first and second end faces 352 and 354, respectively.

Each of the housing shells 40 can define a pair of detent mounts 360 that can be configured to hold the first detent members 312. The first detent members 312 can be leaf springs having a raised protrusion 370 and a pair of tabs 372. The detent mounts 360 can include a pair of tab recesses 374, which can be configured to receive an associated one of the tabs 372, and a contoured platform 376 that can support the portion of the first detent member 312 disposed between the tabs 372. The contoured platform 376 can include a platform recess 378 into which the raised protrusion 370 may be moved when the switch 310 is moved between the first, second and third positions. The raised protrusions 370 of the first detent members 312 are configured to engage an associated one of the detent recesses 348 that are formed in the plate structure 330

Each of the rails 314 can include a generally cylindrical rail body 380 and a head portion 382 that can be relatively larger in diameter than the rail body 380. The rails 314 can be received through the bushing apertures 350 such that the bushings 336 are slidably mounted on the rail bodies 380.

The collar 316 can be an annular structure that can include a pair of mounts 400, an internal engagement feature 402, a fourth external engagement feature 404 and a fifth external engagement feature 406. An end of the rail bodies 380 opposite the head portions 382 can be received into the mounts 400 to fixedly couple the rails 314 to the collar 316. In the particular example provided, the rail bodies 380 are press-fit into the mounts 400, but it will be appreciated that other coupling techniques, including bonding, adhesives, pins, and threaded fasteners, could be employed to couple the rails 314 to the collar 316. The internal engagement feature 402 can be formed about an inner diameter of the collar 316 and can be sized to engage the first external engagement feature 152 (FIG. 5) that is formed on the first input ring gear 130 (FIG. 5) and the second external engagement feature 164 (FIG. 5) that is formed on the second input ring gear 132 (FIG. 5). In the particular example provided, the internal engagement feature 402 comprises a fifth set of internal teeth 410 that is configured to be engagable with the first set of external teeth 154 (FIG. 5) and the second set of external teeth 166 (FIG. 5). The fourth external engagement feature 404 can comprise a set of external teeth or splines 412 that can be slidingly engaged with corresponding internal teeth or splines 414 that are coupled to (e.g., integrally formed with) the gear case 42 as shown in FIG. 3. Returning to FIG. 10, the fifth external engagement feature 406 can include a sixth set of external teeth 416 that can be formed on a front axial surface 418 of the collar 316. The fifth external engagement feature 406 can be selectively engaged with the third external engagement feature 202 on the intermediate ring gear 186 (i.e., the sixth set of external teeth 416 can be selectively engaged to the fourth set of external teeth 204) to couple the collar 316 to the intermediate ring gear 186.

Each first biasing spring 318 can be mounted on an associated one of the rail bodies 380 between the head portion 382 and the first end face 352 of an associated one of the bushings 336. Each second biasing spring 320 can be mounted on an associated one of the rail bodies 380 between the second end face 354 of an associated one of the bushings 336 and the collar 316. With additional reference to FIG. 11, the third biasing spring 324 can be disposed between an annular lip 420 in the gear case 42 and the front face 432 of the intermediate ring gear 186.

Figure 12:
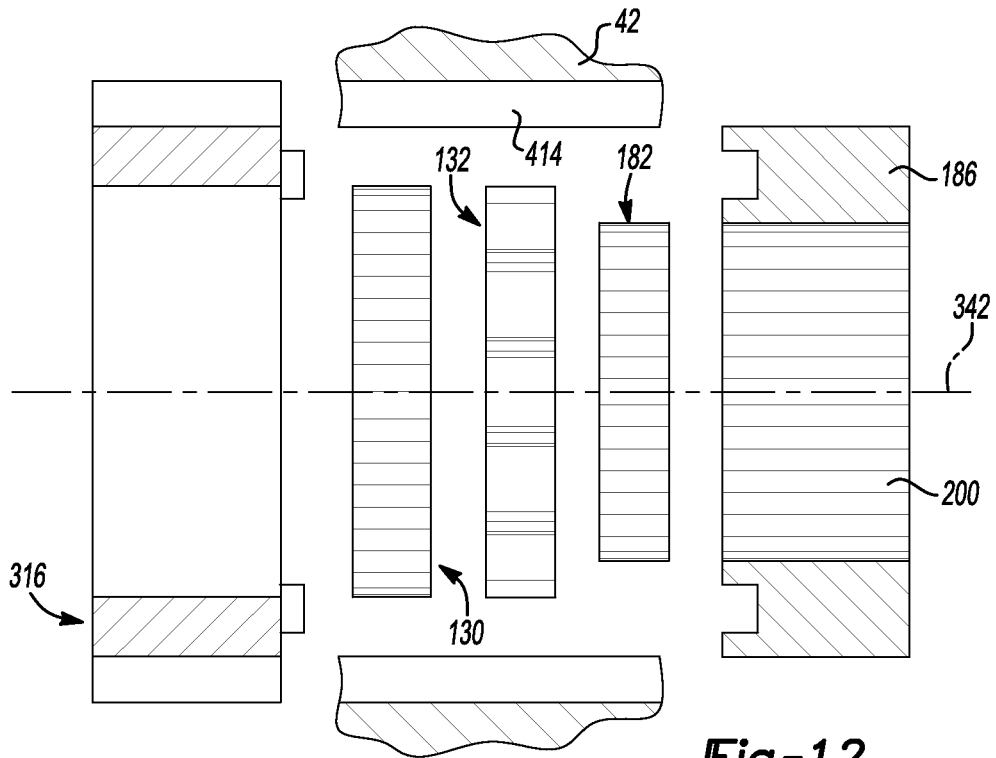
FIGS. 12 through 15 are schematic representations of the transmission assembly, illustrating the collar of the speed selector in various positions.

With reference to FIG. 12, the collar 316, the first input ring gear 130, the second input ring gear 132, the intermediate reduction carrier 182 and the intermediate ring gear 186 are schematically shown relative to the longitudinal axis 342 of the reduction gearset assembly 100 (FIG. 2) and the internal splines 414 that are coupled to the gear case 42. It will be appreciated that the collar 316 and the intermediate ring gear 186 can move axially along the longitudinal axis 342.

With reference to FIGS. 2, 5 through 7 and 10, the reduction gearset assembly 100 can be operated in a high speed ratio when the switch 310 is located in the third position. In this position, the collar 316 can be aligned relative to the first and second input ring gears 130 and 132 and the intermediate ring gear 186 such that the internal engagement feature 402 on the collar 316 is engaged with only the first external engagement feature 152 on the first input ring gear 130 and the collar 316 is axially spaced apart from the intermediate ring gear 186 so as to be disengaged therefrom. In this condition, the first input ring gear 130 is torsionally grounded (i.e., non-rotatably coupled) through the collar 316 to the gear case 42, the second input ring gear 132 is permitted to rotate, and the third biasing spring 324 biases the intermediate ring gear 186 rearwardly (i.e., in a direction toward the motor assembly 14) such that the third set of internal teeth 200 formed on the intermediate ring gear 186 are engaged with the third set of external teeth 198 on the first plate member 190 of the intermediate reduction carrier 182. Accordingly, rotary power received from the output shaft 58 of the motor assembly 14 is input into the input stage 110 via the first input sun gear 120. The first input sun gear 120, the first set of input planetary gears 126, the input reduction carrier 124 and the first input ring gear 130 cooperate to perform a first input speed reduction and torque multiplication operation and to output a first intermediate rotary output to the intermediate stage 112. Power is not transmitted through the second input sun gear 122, the set of second input planetary gears 128 or the second input ring gear 132. Moreover, as the intermediate ring gear 186 is fixed for rotation with the intermediate reduction carrier 182, the intermediate stage 112 does not perform a speed reduction and torque multiplication function, but rather provides a second intermediate rotary output that is about equal in speed and torque to the speed and torque of the first intermediate rotary output. Rotary power output from the intermediate stage 112 is received by the output stage 114, which performs a final speed reduction and torque multiplication operation and provides a final rotary output that is transmitted to the output spindle 20.

Figure 13:
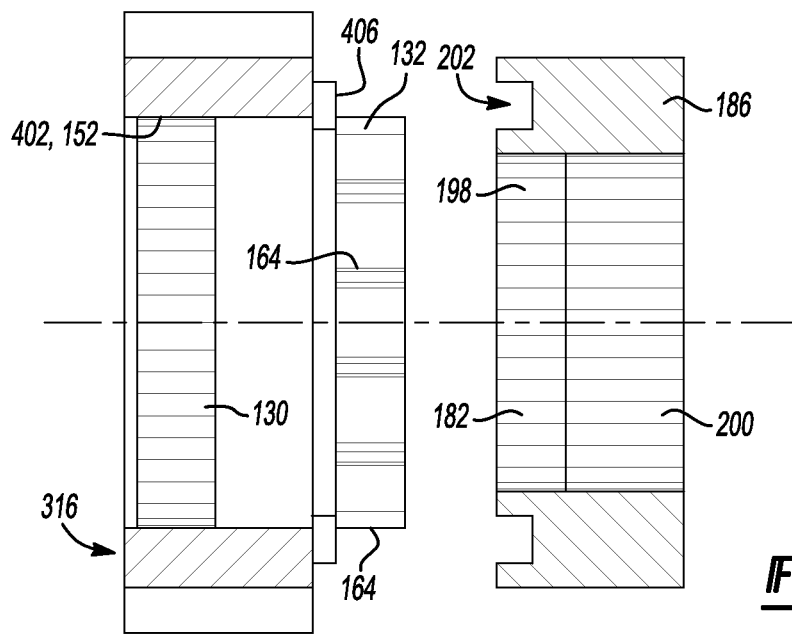

Operation in the high speed ratio is schematically illustrated in FIG. 13 wherein the internal engagement feature 402 on the collar 316 is engaged to the first external engagement feature 152 on the first input ring gear 130 and the third set of external teeth 198 on the intermediate reduction carrier 182 are meshingly engaged to the third set of internal teeth 200 on the intermediate ring gear 186.

Returning to FIGS. 2, 5 through 7 and 10, the reduction gearset assembly 100 can be operated in a medium speed ratio when the switch 310 is located in the second position. In this position, the collar 316 can aligned relative to the first and second input ring gears 130 and 132 and the intermediate ring gear 186 such that the internal engagement feature 402 on the collar 316 is engaged with only the second external engagement feature 164 on the second input ring gear 132 and the collar 316 is axially spaced apart from the intermediate ring gear 186 so as to be disengaged therefrom. In this condition, the second input ring gear 132 is torsionally grounded (i.e., non-rotatably coupled) through the collar 316 to the gear case 42, the first input ring gear 130 is permitted to rotate, and the third biasing spring 324 biases the intermediate ring gear 186 rearwardly such that the third set of internal teeth 200 formed on the intermediate ring gear 186 are engaged with the third set of external teeth 198 on the first plate member 190 of the intermediate reduction carrier 182. Accordingly, rotary power received from the output shaft 58 of the motor assembly 14 is input to the input stage 110 via the second input sun gear 122. The second input sun gear 122, the second set of input planetary gears 128, the input reduction carrier 124 and the second input ring gear 132 cooperate to perform a second input speed reduction and torque multiplication operation and output the first intermediate rotary output to the intermediate stage 112. Those of skill in the art will appreciate that the speed and torque achieved through the second input speed reduction and torque multiplication operation are different from the speed and torque achieved through the first input speed reduction and torque multiplication operation. Power is not transmitted through the first input sun gear 120, the set of first input planetary gears 126 or the first input ring gear 130. Moreover, as the intermediate ring gear 186 is fixed for rotation with the intermediate reduction carrier 182, the intermediate stage 112 does not perform a speed reduction and torque multiplication operation, but rather provides a second intermediate rotary output that is about equal in speed and torque to the speed and torque of the first intermediate rotary output. Rotary power output from the intermediate stage 112 is received by the output stage 114, which performs the final speed reduction and torque multiplication operation and provides a final rotary output that is transmitted to the output spindle 20.

Figure 14:
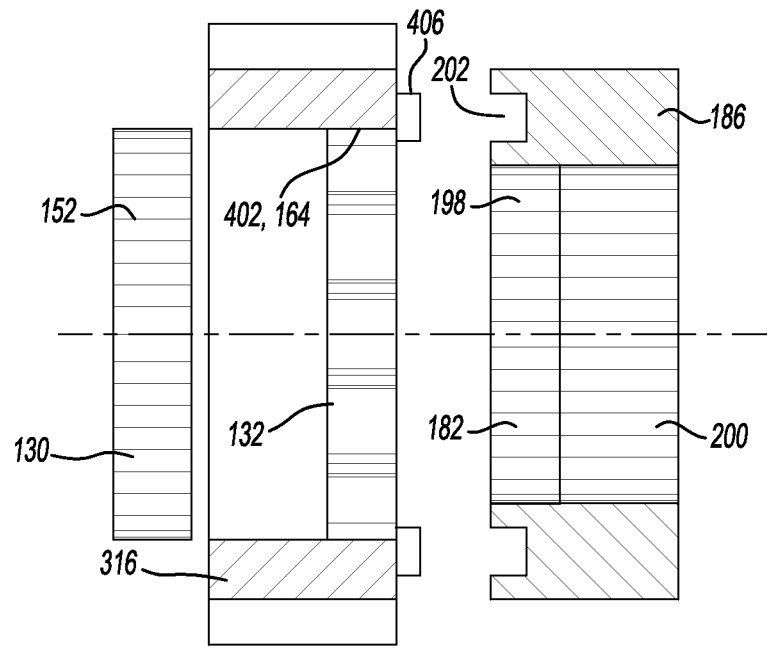

Operation in the medium speed ratio is schematically illustrated in FIG. 14 wherein the internal engagement feature 402 on the collar 316 is engaged to the second external engagement feature 164 on the second input ring gear 132 and the third set of external teeth 198 on the intermediate reduction carrier 182 are meshingly engaged to the third set of internal teeth 200 on the intermediate ring gear 186.

With renewed reference to FIGS. 2, 5 through 7 and 10, the reduction gearset assembly 100 can be operated in a low speed ratio when the switch 310 is located in the third position. In this position, the collar 316 can aligned relative to the first and second input ring gears 130 and 132 and the intermediate ring gear 186 such that the internal engagement feature 402 on the collar 316 is engaged with only the second external engagement feature 164 on the second input ring gear 132 and the collar 316 is abutted against the intermediate ring gear 186 to drive the intermediate ring gear 186 forwardly (i.e., toward the chuck 26 (FIG. 1)). In this condition, the second input ring gear 132 is torsionally grounded through the collar 316 to the gear case 42, the first input ring gear 130 is permitted to rotate, and the collar 316 is positioned to drive the intermediate ring gear 186 forwardly against the bias of the third biasing spring 324 such that the third set of internal teeth 200 formed on the intermediate ring gear 186 are disengaged from the third set of external teeth 198 on the first plate member 190 of the intermediate reduction carrier 182 and the third external engagement feature 202 on the intermediate ring gear 186 is engaged to the fifth external engagement feature 406 on the collar 316 to thereby torsionally ground the intermediate ring gear 186 to the gear case 42 through the collar 316. Accordingly, rotary power received from the output shaft 58 of the motor assembly 14 is input to the input stage 110 via the second input sun gear 122. The second input sun gear 122, the second set of input planetary gears 128, the input reduction carrier 124 and the second input ring gear 132 cooperate to perform the second input speed reduction and torque multiplication operation and output the first intermediate rotary output to the intermediate stage 112. Power is not transmitted through the first input sun gear 120, the set of first input planetary gears 126 or the first input ring gear 130. Rotary power can be received into the intermediate stage 112 through the intermediate sun gear 180. The intermediate sun gear 180, the set of intermediate planetary gears 184, the intermediate reduction carrier 182 and the intermediate ring gear 186 cooperate to perform an intermediate speed reduction and torque multiplication operation and output the second rotary output to the output stage 114. Rotary power output from the intermediate stage 112 is received by the output stage 114, which performs the final speed reduction and torque multiplication operation and provides a final rotary output that is transmitted to the output spindle 20.

Figure 15:
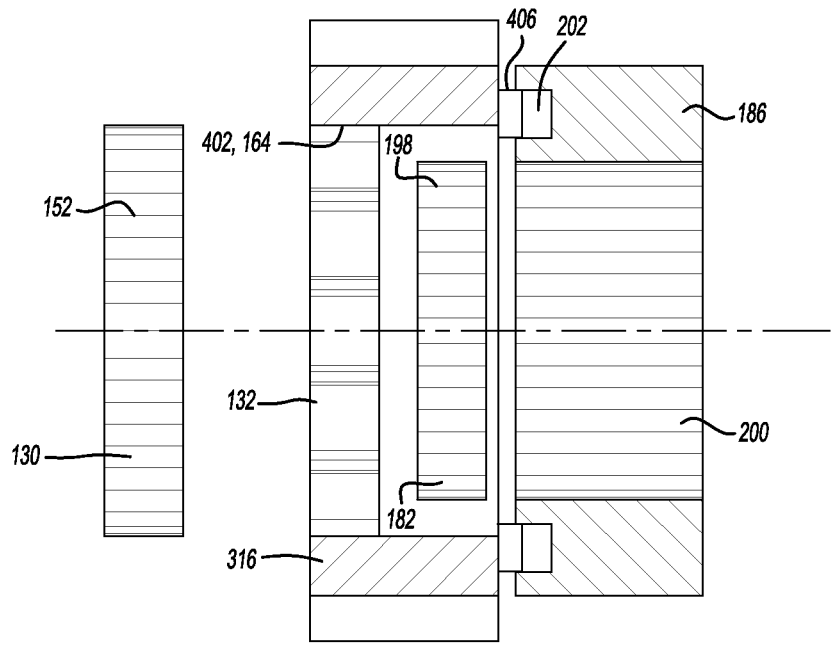

Operation in the low speed ratio is schematically illustrated in FIG. 15 wherein the internal engagement feature 402 on the collar 316 is engaged to the second external engagement feature 164 on the second input ring gear 132, the third set of external teeth 198 on the intermediate reduction carrier 182 are disengaged from the third set of internal teeth 200 on the intermediate ring gear 186, and the fifth external engagement feature 406 on the collar 316 is engaged to the third external engagement feature 202 on the intermediate ring gear 186.

Returning to FIG. 10, it will be appreciated that the first and second biasing springs 318 and 320 are configured to resiliently couple the collar 316 to the switch 310 in a manner that provides for a modicum of compliance.

In instances where the switch 310 is to be moved from the first position to the second position but the second external engagement feature 164 (FIG. 5) on the second input ring gear 132 (FIG. 5) is not aligned to the internal engagement feature 402 on the collar 316, the switch 310 can be translated into the second position without fully moving the collar 316 by an accompanying amount. In such situations, the second biasing springs 320 are compressed between the second end face 354 of the bushings 336 and the mounts 400 of the collar 316. Rotation of the second input ring gear 132 (FIG. 5) relative to the collar 316 can permit the second external engagement feature 164 (FIG. 5) to align to the internal engagement feature 402 and once aligned, the second biasing spring 320 can urge the collar 316 forwardly into engagement with the second input ring gear 132 (FIG. 5).

In instances where the switch 310 is to be moved from the second position to the third position but the third external engagement feature 202 (FIG. 6) on the intermediate ring gear 186 (FIG. 6) is not aligned to the fifth external engagement feature 406 formed on the collar 316, the switch 310 can be translated into the third position while fully moving the collar 316 by an accompanying amount. In such situations, the second biasing springs 320 are not further compressed between the second end face 354 of the bushings 336 and the mounts 400 of the collar 316 but rather the third biasing spring 324 can be compressed when the intermediate ring gear 186 (FIG. 6) is driven relatively further forward due to contact between the axial end faces of the collar 316 and the intermediate ring gear 186 (FIG. 6). Rotation of the intermediate ring gear 186 (FIG. 6) relative to the collar 316 can permit the third external engagement feature 202 (FIG. 6) to align to the fourth external engagement feature 404 and once aligned, the third biasing spring 324 can urge the intermediate ring gear 186 (FIG. 6) rearward into engagement with the collar 316.

In instances where the switch 310 is to be moved from the third position to the second position but the third set of internal teeth 200 (FIG. 6) are not aligned to the third set of external teeth 198 (FIG. 6), the switch 310 can be translated into the second position while fully moving the collar 316 by an accompanying amount. In such situations, the third biasing spring 324 can apply a rearwardly directed force onto the intermediate ring gear 186 (FIG. 6). Rotation of the intermediate ring gear 186 (FIG. 6) relative to the intermediate reduction carrier 182 (FIG. 6) can permit the third set of internal teeth 200 (FIG. 6) to align to the third set of external teeth 198 (FIG. 6) and once aligned, the third biasing spring 324 can urge the intermediate ring gear 186 (FIG. 6) rearward such that the third set of internal teeth 200 (FIG. 6) are engaged to the third set of external teeth 198 (FIG. 6).

In instances where the switch 310 is to be moved from the second position to the first position but the internal engagement feature 402 formed on the collar 316 is not aligned to the first external engagement feature 152 (FIG. 5) formed on the first input ring gear 130 (FIG. 5), the switch 310 can be translated into the first position without fully moving the collar 316 by an accompanying amount. In such situations, the first biasing springs 318 are compressed between the head portion 382 of the rails 314 and the first end face 352 of the bushings 336. Rotation of the first input ring gear 130 (FIG. 5) relative to the collar 316 can permit the first external engagement feature 152 (FIG. 5) to align to the internal engagement feature 402 and once aligned, the first biasing spring 318 can urge the collar 316 rearwardly into engagement with the first input ring gear 130 (FIG. 5).

Clutch Mechanism

Figure 11:
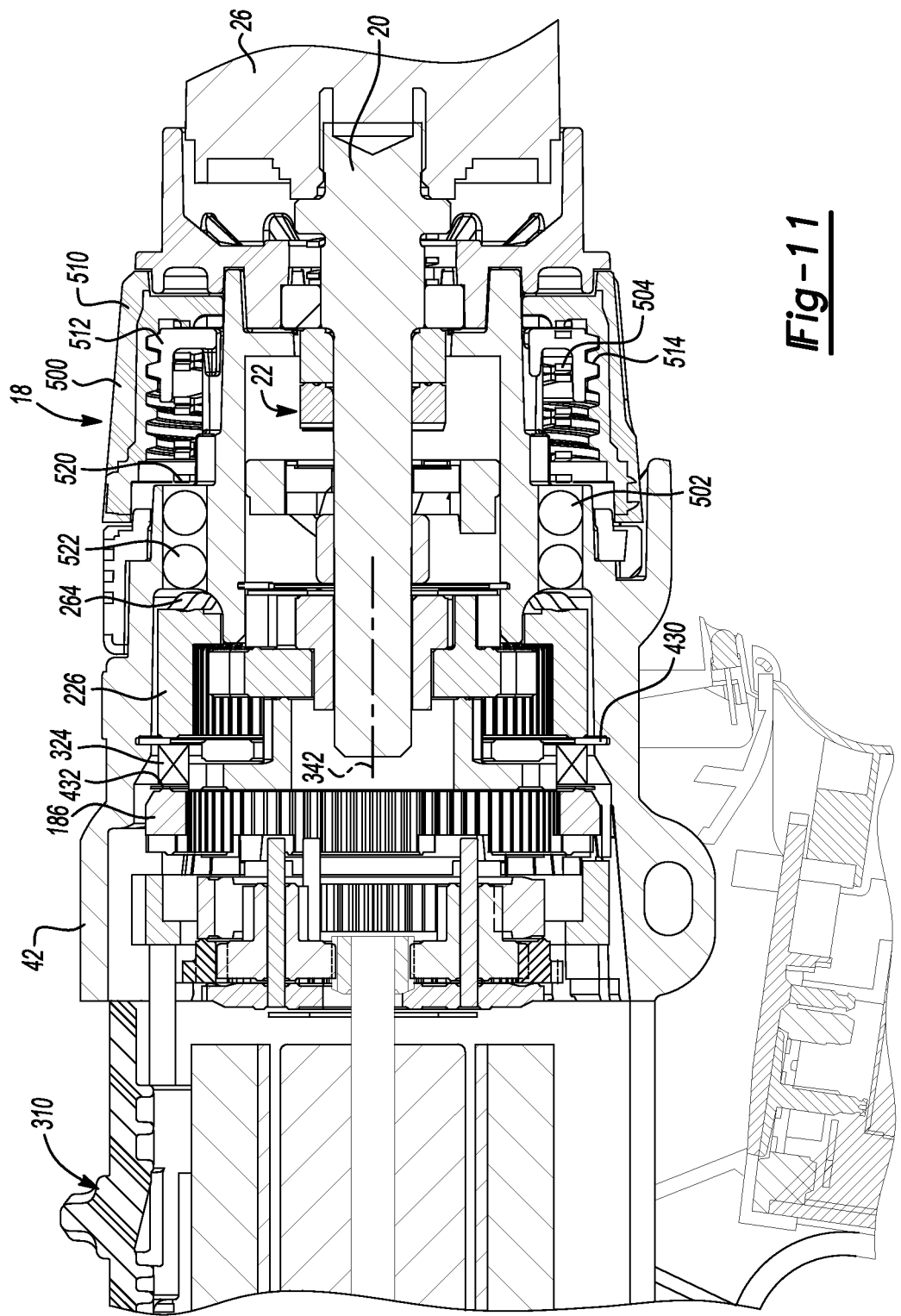
FIG. 11 is a longitudinal section view of a portion of the power tool of FIG. 1.
Figure 16:
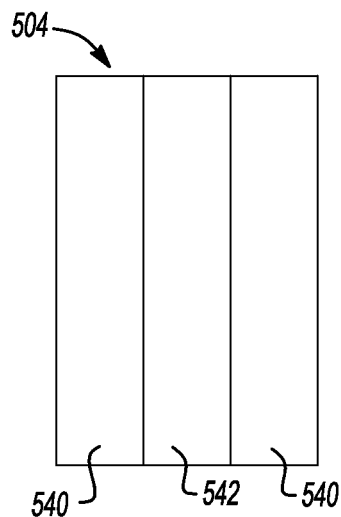
FIG. 16 is a schematic illustration of a portion of the clutch mechanism illustrating a wave spring having three distinct sections.
Figure 25:
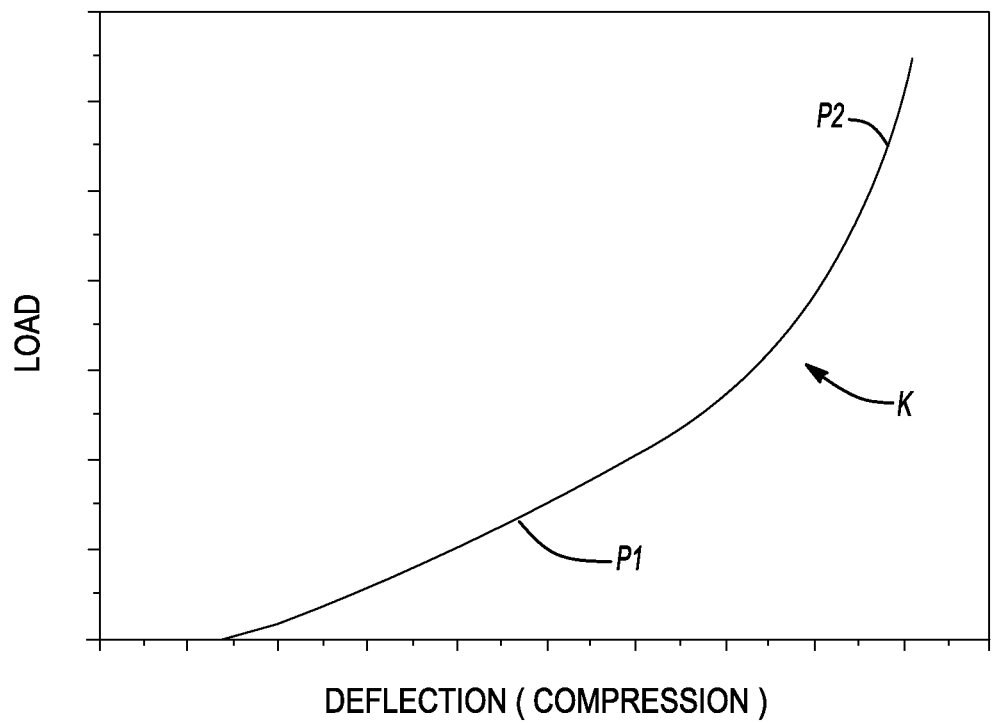
FIG. 25 is a plot illustrating load exerted by the clutch spring as a function of its compression.

With reference to FIGS. 8 and 11, the clutch mechanism 18 can include the clutch profile 264, a clutch adjustment collar 500, a follower structure 502 and a clutch spring 504. The clutch profile 264 can be coupled to (e.g., integrally formed on) a forwardly facing surface of the output ring gear 226. In the example provided, the clutch profile 264 includes a plurality of tapered ramps and a plurality of valleys that are disposed between an adjacent pair of the tapered ramps. The clutch adjustment collar 500 can be rotatably mounted on the gear case 42 and can conventionally include a clutch collar 510, which can be rotatably mounted on the gear case 42, and a clutch nut 512 that can be threadably engaged to an internally threaded portion 514 of the clutch collar 510 and axially movably but non-rotatably coupled to the gear case 42. In this way, rotation of the clutch collar 510 can be employed to effect corresponding translation of the clutch nut 512. The follower structure 502 can include an annular follower body 520 and a plurality of follower members 522. The follower body 520 can be mounted on the gear case 42 coaxially with the clutch adjustment collar 500. The follower members 522 can extend through holes 524 formed in the annular wall member 64 of the gear case 42 generally parallel to the longitudinal axis 342 of the reduction gearset assembly 100. An end of the follower members 522 opposite the follower body 520 is configured to engage the clutch profile 264. In the particular example provided, the follower members 522 include a plurality of bearing balls that are received between the follower body 520 and the clutch profile 264. It will be appreciated, however, that the follower members 522 could be integrally formed with the follower body 520 or that other shaped follower members 522 could be employed. The clutch spring 504 can be disposed between the clutch nut 512 and the follower body 520 and is configured to exert a force on the follower structure 502 that is transmitted through the follower members 522 to the clutch profile 264. In the particular example provided, the clutch spring 504 is a wave spring having a non-linear spring rate, such as a non-linear spring rate that produces a spring load versus spring deflection curve with a distinct knee K between a first portion P1, which is generally defined by a first spring rate, and a second portion P2 that is generally defined by a second spring rate that is greater than the first spring rate as depicted in FIG. 25. With specific reference to FIG. 16, the clutch spring 504 can include end sections 540 and a mid-section 542 that is disposed between the end sections 540. Each of the end sections 540 can be configured with a first spring rate, while the mid-section 542 can be configured with a second spring rate that is higher than the first spring rate.

Returning to FIGS. 8 and 11, those of skill in the art will appreciate that when a reaction torque acting on the output ring gear 226 exceeds a clutch torque that is set through adjustment of the clutch adjustment collar 500, the output ring gear 226 will rotate such that the tapered ramps on the clutch profile 264 ride or cam over the follower members 522. Such rotation of the output ring gear 226 effectively limits the torque that is output from the transmission assembly 16 to the output spindle 20.

Hammer Mechanism

With reference to FIG. 8, the hammer mechanism 22 can include a first cam 600 and a second cam 602. The first cam 600 can include a plurality of first tapered ramps 610 and can be coupled for rotation with the output spindle 20. The output spindle 20 is supported by the spindle lock 250 and one or more bearings (e.g., bearing 611) for axial translation and rotation. More specifically, inside surfaces 250a and 611a of the spindle lock 250 and the bearing 611, respectively, engage the output spindle 20 in a slip fit manner that permits the permits the output spindle 20 to translate along the longitudinal axis 342 of the reduction gearset assembly 100 (FIG. 2). Rearward translation of the output spindle 20 can be limited through contact between the output spindle 20 and the gear case 42, while forward translation of the output spindle 20 can be limited by contact between the bearing 611 and the gear case 42. The second cam 602 can include a plurality of second tapered ramps 612, which can be configured to matingly engage the first tapered ramps 610, and can be non-rotatably but axially movably mounted in the gear case 42.

The hammer mechanism 22 can be disengaged by positioning the second cam 602 in a rearward position (by the mode change mechanism 24, as will be described in greater detail, below) that is axially rearward of the first cam 600 by a distance that is sufficient to prevent engagement between the first and second cams 600 and 602 when the output spindle 20 is pushed into its rearward most position. The hammer mechanism 22 can be engaged by positioning the second cam 602 in a forward position (by the mode change mechanism 24) where the first cam 600 can contact the second cam 602 when the output spindle 20 is pushed axially rearward. As the first cam 600 rotates with the output spindle 20 and the second cam 602 is non-rotatably coupled to the gear case 42, the first tapered ramps 610 of the first cam 600 can alternately engage and disengage the second tapered ramps 612 of the second cam 602 to cause axial movement of the output spindle 20 when the power tool 10 is operated and a rearwardly directed force is applied to the output spindle 20.

Mode Change Mechanism

With reference to FIGS. 8 and 11, the mode change mechanism 24 can include a mode collar 700, an idler gear 702, a mode selection cam plate 704, a clutch bypass member 706, a hammer activation member 708, a bypass member biasing spring 710 and an activation member biasing spring 712.

Figure 17:
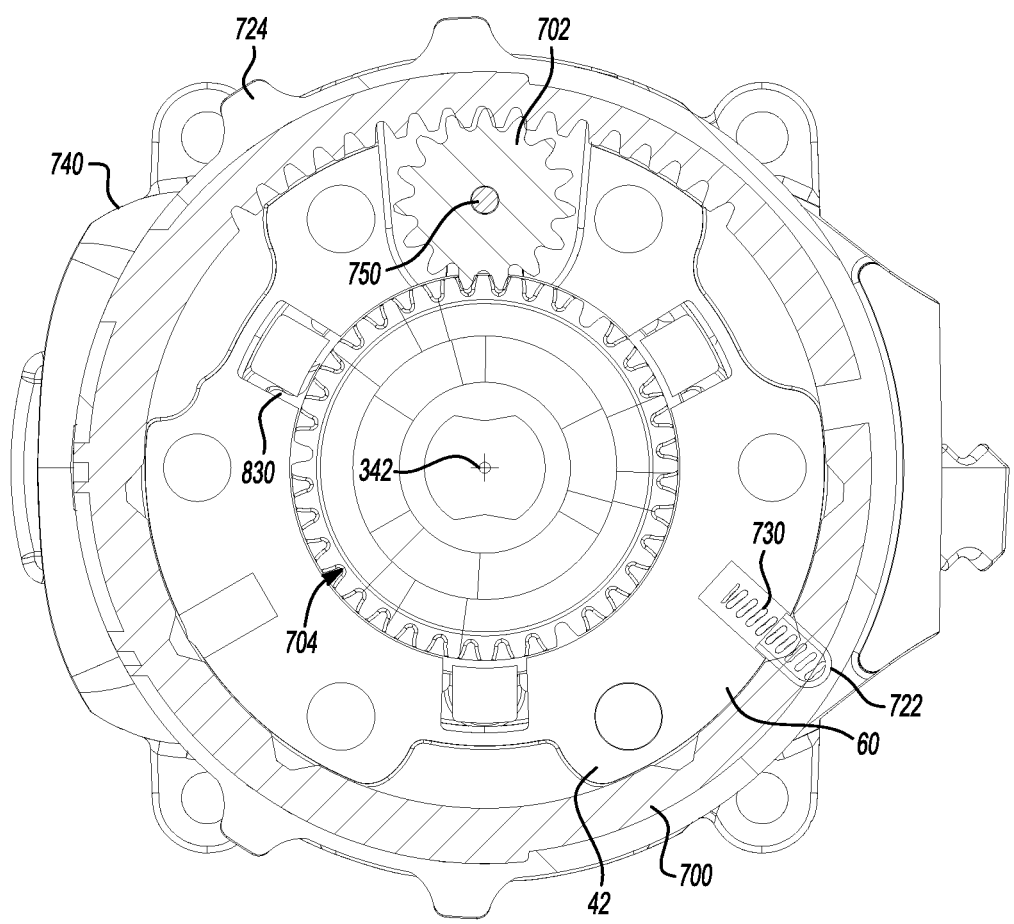
FIG. 17 is a lateral cross-section taken through the power tool of FIG. 1 and illustrating a portion of the mode change mechanism.

With reference to FIGS. 8 and 17, the mode collar 700 can be an annular structure that can be received about the rear case portion 60 of the gear case 42 rearwardly of the clutch adjustment collar 500. The mode collar 700 can include a plurality of internal teeth 720, three mode detent recesses 722 and one or more mode tabs 724. The rear case portion 60 of the gear case 42 can carry a mode detent 730 that can resiliently engage the mode detent recesses 722 to inhibit relative rotation between the mode collar 700 and the gear case 42. The mode tabs 724 can be configured to permit an operator to better grip and rotate the mode collar 700. Features, such as shallow tapered walls 740, can be formed in the rear case portion 60 and can contact the mode tabs 724 to limit rotation of the mode collar 700 relative to the gear case 42.

The idler gear 702 can be rotatably mounted on the gear case 42 and can include teeth that can be meshingly engaged to the internal teeth 720 on the mode collar 700. In the example provided, an idler gear aperture is formed in the front case portion 62 of the gear case 42 and an axle 750 is fitted through the idler gear 702 into the annular wall member 64 of the gear case 42.

With reference to FIGS. 8, 17, 18 and 23, the mode selection cam plate 704 can be received in the front case portion 62 for rotation therein. The mode selection cam plate 704 can include a plurality of external teeth 760, which can be meshingly engaged to the teeth of the idler gear 702, a clutch bypass surface 770 and a hammer activation surface 772. A hole 774 can be formed through the mode selection cam plate 704 through which the output spindle 20 can be received. The clutch bypass surface 770 can define a plurality of circumferentially spaced apart first lands 780, a plurality of circumferentially spaced apart second lands 782, and a plurality of ramps 784, each of which connecting one of the first lands 780 to an associated one of the second lands 782. The hammer activation surface 772 can be disposed radially inwardly of the clutch bypass surface 770 and can define a plurality of circumferentially spaced apart third lands 790, a plurality of circumferentially spaced apart fourth lands 792 and a plurality of ramps 794, each of which connecting one of the third lands 790 to an associated one of the fourth lands 792.

Figure 19:
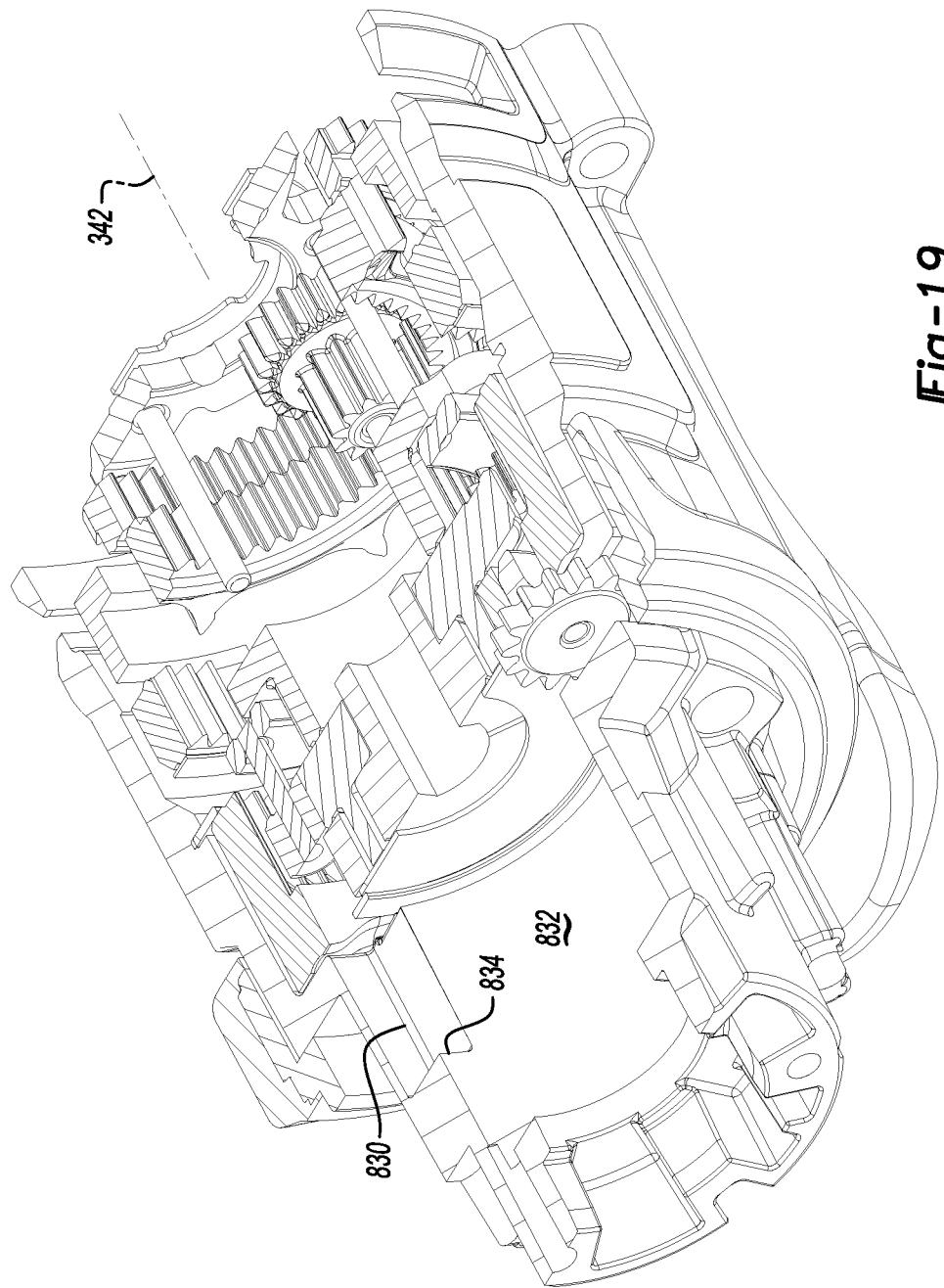
FIG. 19 is a perspective section view of a portion of the power tool of FIG. 1 illustrating the construction of the gear case in more detail.

The clutch bypass member 706 can include an annular body 800 and a plurality of lugs 802. The annular body 800 can define a central bore 810, a plurality of guide ways 812 and a first cam follower 814. The guide ways 812 can extend through the annular body 800 generally parallel to a longitudinal axis of the central bore 810. The first cam follower 814 can be sized to engage the clutch bypass surface 770 on the mode selection cam plate 704. The first cam follower 814 can include a plurality of first lands 820, a plurality of second lands 822, and a plurality of tapered ramps 824. Rotation of the mode selection cam plate 704 into a first position can locate the second lands 822 on the annular body 800 in abutment with the first lands 780 on the clutch bypass surface 770 to position the clutch bypass member 706 in a forward position. Rotation of the mode selection cam plate 704 into a second position or a third position can locate the first and second lands 820 and 822 in abutment with the first and second lands 780 and 782, respectively, as well as the tapered ramps 824 in abutment with the tapered ramps 784 such that the clutch bypass member 706 is disposed in a rearward position. The lugs 802 can be circumferentially spaced apart about the exterior periphery of the annular body 800 and can extend rearwardly from the annular body 800 generally perpendicular to the longitudinal axis of the central bore 810. The lugs 802 can have any desired shape but in the particular example provided, have a shape that corresponds to a shape of a plurality of first guide passages 830 (FIG. 17) formed in the front case portion 62 of the gear case 42. The first guide passages 830 can be formed into a rear side of the front case portion 62 radially outwardly of a central cylindrical surface 832 (FIG. 19) and can terminate at an end wall 834 (FIG. 19). It will be appreciated that the lugs 802 can be disposed radially outwardly of the mode selection cam plate 704 and that the central cylindrical surface 832 (FIG. 19) can help to align a rotational axis of the mode selection cam plate 704 to the longitudinal axis 342 of the reduction gearset assembly 100 (FIG. 2). The first guide passages 830 can cooperate with the lugs 802 to inhibit relative rotation between the clutch bypass member 706 and the gear case 42, as well as to guide the clutch bypass member 706 as it translates along an axis that is coincident with the longitudinal axis 342 of the reduction gearset assembly 100 (FIG. 2).

The hammer activation member 708 can include an annular body 850 and a plurality of lugs 852 that can define a second cam follower 854. The annular body 850 can define a central bore 856 into which the second cam 602 can be received. The second cam 602 can be fixedly coupled to the annular body 850 through any appropriate means, including an interference fit. The lugs 852 can be circumferentially spaced apart about the exterior periphery of the annular body 850 and can extend rearwardly from the annular body 850 generally perpendicular to the longitudinal axis of the central bore 856. The lugs 852 can have any desired shape but in the particular example provided, have a shape that corresponds to a shape of the guide ways 812 in the annular body 800 of the clutch bypass member 706. The guide ways 812 can cooperate with the lugs 852 to inhibit relative rotation between the hammer activation member 708 and the gear case 42, as well as to guide the hammer activation member 708 as it translates along an axis that is coincident with the longitudinal axis 342 of the reduction gearset assembly 100 (FIG. 2). The second cam follower 854 can be sized to engage the hammer activation surface 772 on the mode selection cam plate 704. The second cam follower 854 can include a plurality of third lands 860 and a plurality of tapered ramps 864. Rotation of the mode selection cam plate 704 into the first position can locate the third lands 860 in abutment with the fourth lands 792, as well as the tapered ramps 864 in abutment with the tapered ramps 794 such that the hammer activation member 708 is disposed in a rearward position. Rotation of the mode selection cam plate 704 into a third position can locate the third lands 860 on the annular body 850 in abutment with the third lands 790 on the hammer activation surface 772 to position the hammer activation member 708 in a forward position.

With reference to FIG. 8, the bypass member biasing spring 710 can be received between the front case portion 62 of the gear case 42 and the clutch bypass member 706 and can exert a rearwardly directed biasing force onto the clutch bypass member 706. The activation member biasing spring 712 can be received between the front case portion 62 of the gear case 42 and the hammer activation member 708 and can exert a rearwardly directed biasing force onto the hammer activation member 708.

In operation, the mode collar 700 can be moved between a first mode position, a second mode position and a third mode position to cause corresponding movement of the mode selection cam plate 704 between the first position, the second position and the third position, respectively.

Figure 18:
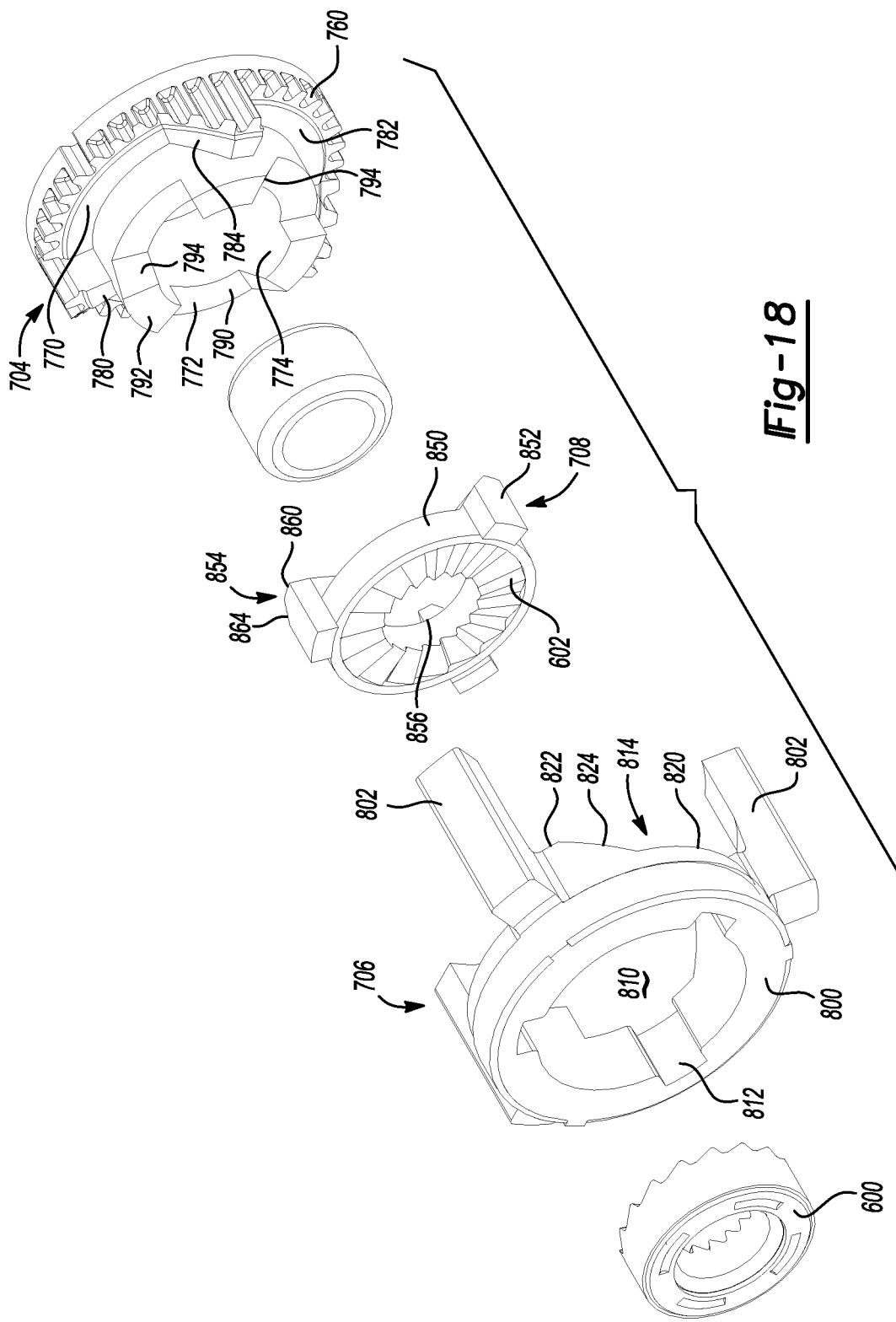
FIG. 18 is an exploded perspective view of a portion of the mode change mechanism.
Figure 20:
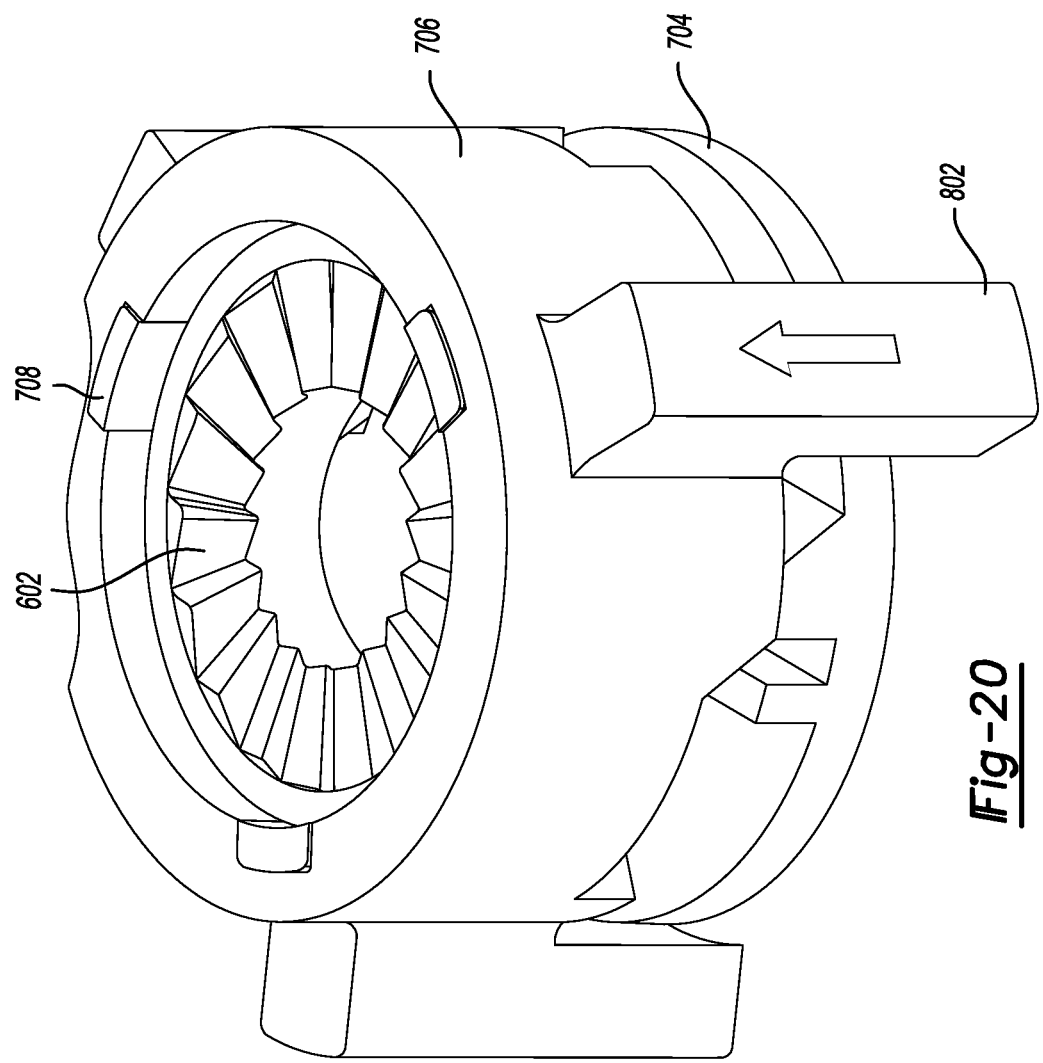
FIGS. 20, 21 and 22 illustrate portions of the mode change mechanism of FIG. 18 and depict the relative positioning of the mode selection cam plate, the clutch bypass member, the hammer activation member and the second cam when the mode collar is moved to first, second and third positions, respectively.

With reference to FIGS. 8, 18 and 20 when the mode collar 700 is disposed in the first mode position (i.e., the mode selection cam plate 704 is in the first position), the clutch bypass member 706 can be disposed in its forward position such that the lugs 802 of the clutch bypass member 706 are axially spaced apart (forwardly) from the clutch bypass lugs 262, while the hammer activation member 708 can be disposed in its rearward position such that the second cam 602 is axially spaced apart (rearwardly) from the first cam 600. In this condition, the clutch mechanism 18 is permitted to function in its normal manner (i.e., to resist rotation of the output ring gear 226 until the reaction torque acting on the output ring gear 226 exceeds a user-selected clutch torque) and the hammer mechanism 22 is deactivated.

Figure 21:
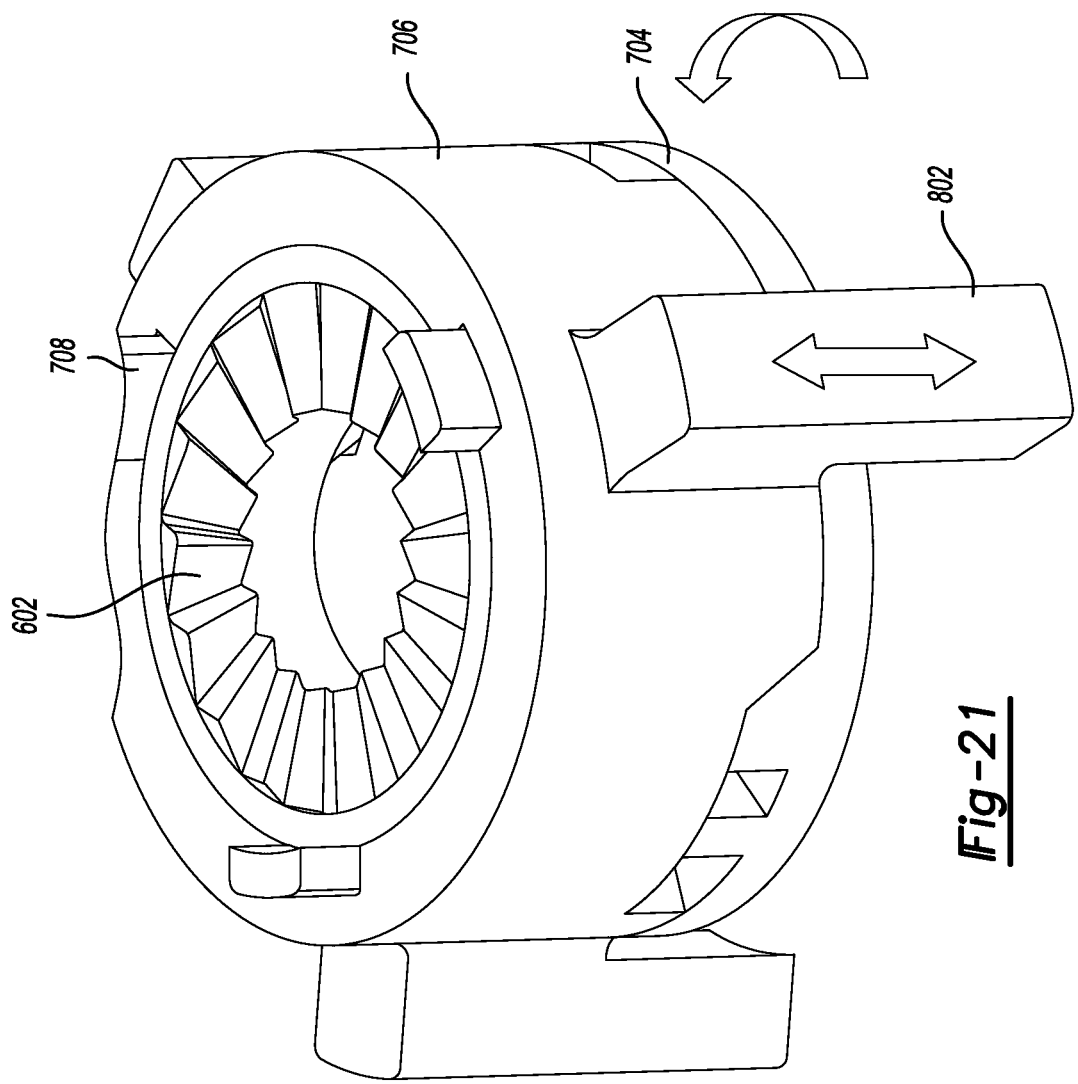

With reference to FIGS. 8, 18 and 21, rotation of the mode collar 700 from the first mode position to the second mode position can cause corresponding rotation of the mode selection cam plate 704 (via the idler gear 702) such that the mode selection cam plate 704 is positioned in its second position. Correspondingly, the clutch bypass member 706 can be disposed in its rearward position such that the lugs 802 of the clutch bypass member 706 are disposed between adjacent ones of the clutch bypass lugs 262, while the hammer activation member 708 can be disposed in its rearward position such that the second cam 602 is axially spaced apart (rearwardly) from the first cam 600. In this condition, the hammer mechanism 22 is deactivated and the clutch mechanism 18 is bypassed so that the torque that is output from the power tool 10 (FIG. 1) is not affected by the setting of the clutch mechanism 18. In instances where the torque reaction acting on the output ring gear 226 exceeds the user-selected clutch torque, the output ring gear 226 can rotate slightly to engage the confronting surfaces 270 of the clutch bypass lugs 262 against the lugs 802 of the clutch bypass member 706 to thereby arrest further rotation of the output ring gear 226.

Figure 22:
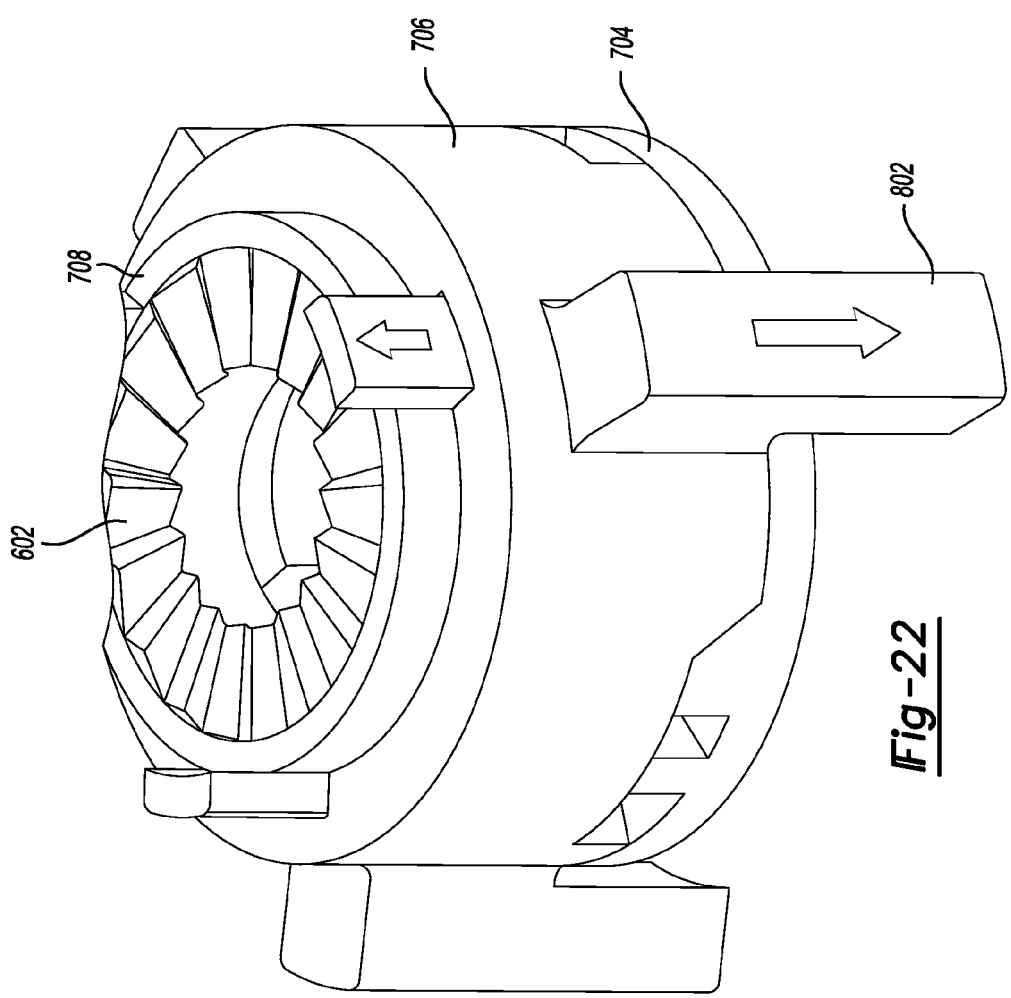
Figure 23:
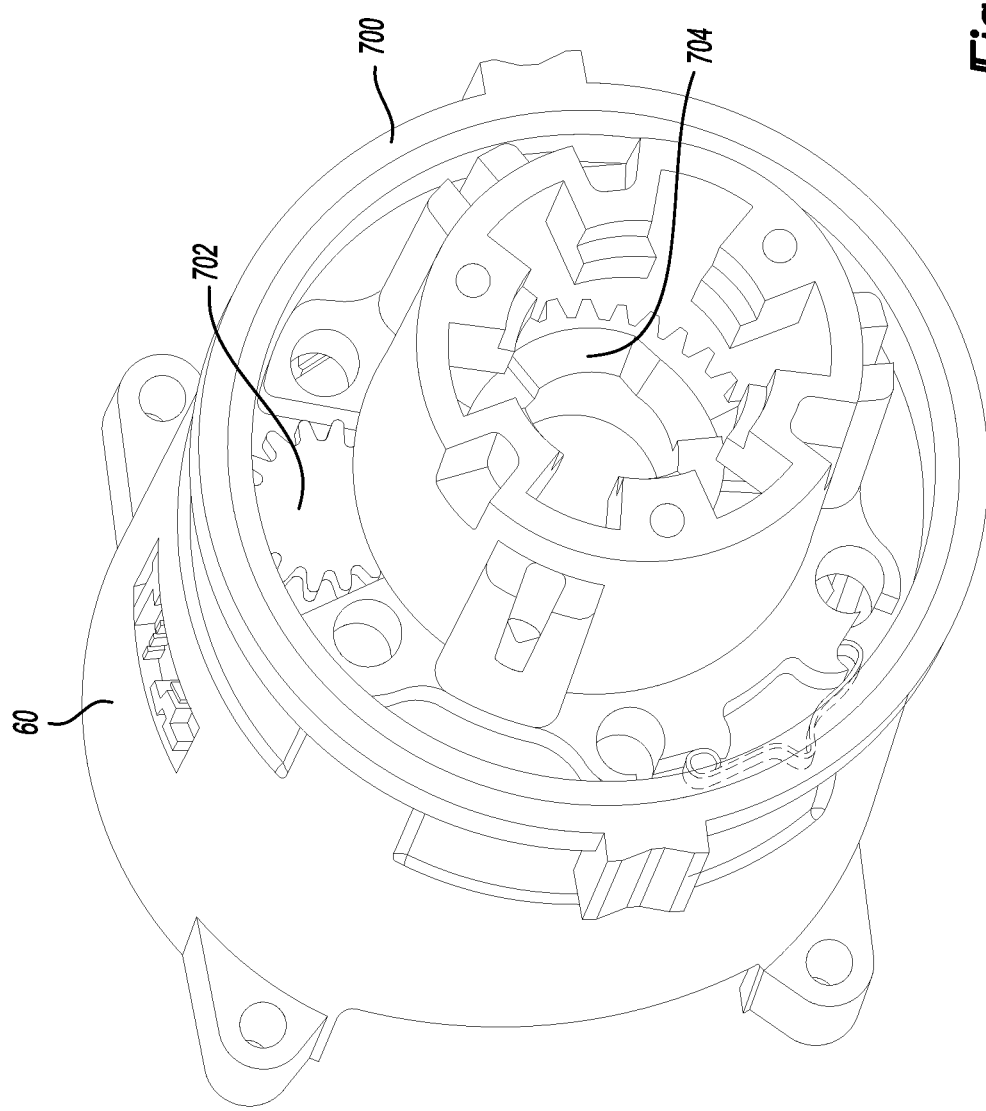
FIGS. 23 and 24 are sectional views of a portion of the power tool of FIG. 1 illustrating the mode change mechanism in more detail.
Figure 24:
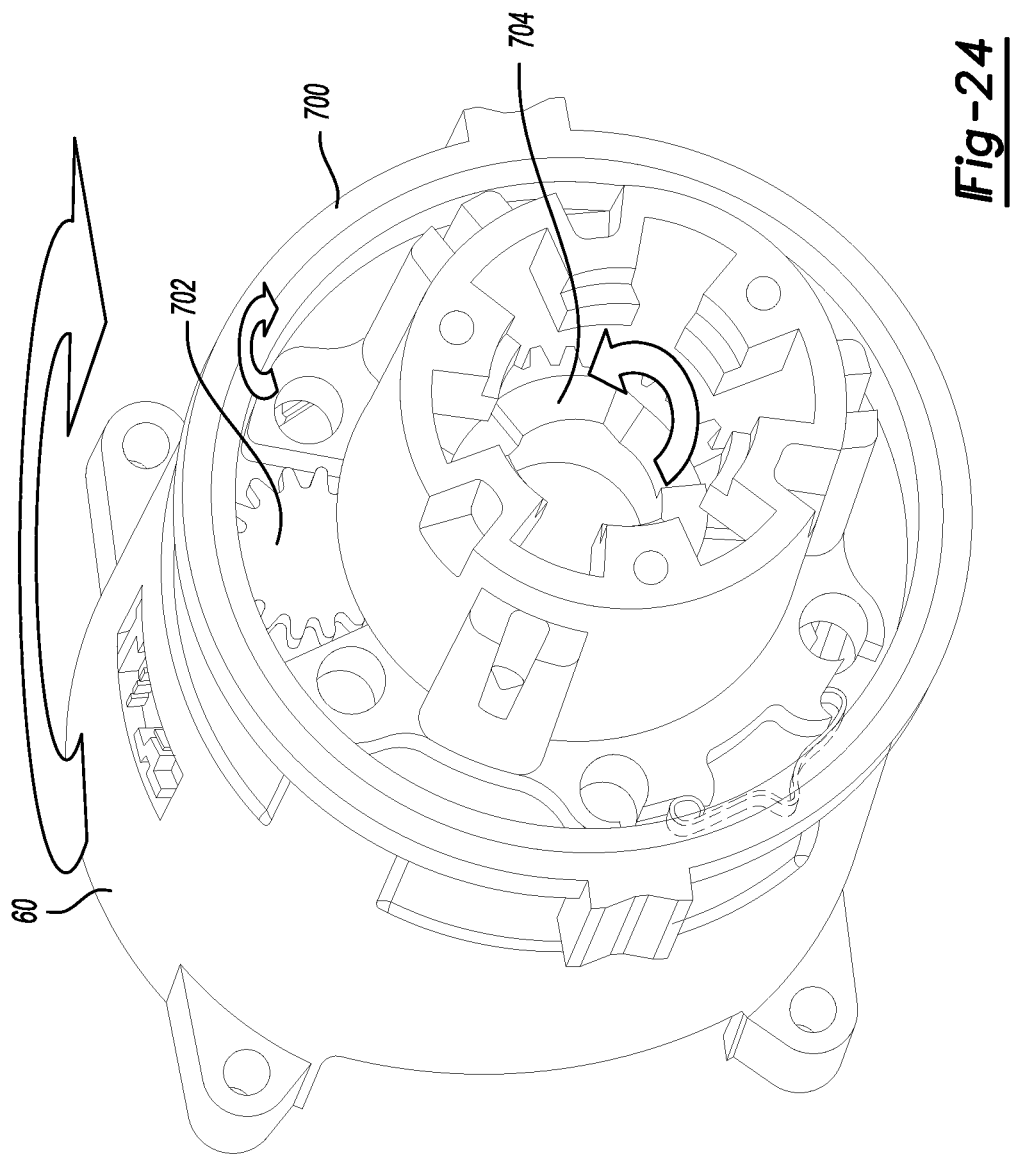

With reference to FIGS. 8, 18 and 22, rotation of the mode collar 700 from the second mode position to the third mode position can cause corresponding rotation of the mode selection cam plate 704 (via the idler gear 702) such that the mode selection cam plate 704 is positioned in its third position. Correspondingly, the clutch bypass member 706 can remain in its rearward position such that the lugs 802 of the clutch bypass member 706 are disposed between adjacent ones of the clutch bypass lugs 262, while the hammer activation member 708 can be disposed in its forward position such that the second cam 602 is spaced proximate the first cam 600 for the first ramps 784 to contact the second ramps 784 when a rearwardly directed force is applied to the output spindle 20. In this condition, the clutch mechanism 18 is bypassed as described above and the hammer mechanism 22 is activated.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power tool comprising:
a housing defining a handle;
a motor received in the housing;
a trigger mounted to the handle and coupled to the motor, the trigger being adapted to control operation of the motor in response to an input provided by an operator of the power tool by coupling the motor to a source of power;
an output member;
a multi-speed transmission coupling the motor and the output member, the multi-speed transmission comprising a planetary stage with a planet carrier, a plurality of compound planetary gears, a first ring gear and a second ring gear, the planet carrier having a carrier body and a plurality of pins that are fixed to the carrier body, each of the compound planetary gears being rotatably mounted on an associated one of the pins, each of the compound planetary gears having a first planet gear, which is meshingly engaged to the first ring gear, and a second planet gear that is meshingly engaged to the second ring gear and coupled to the first planet gear for common rotation;
wherein the pins are spaced circumferentially about the carrier body such that each pair of adjacent pins is spaced apart by a spacing angle, and wherein at least two different spacing angles are employed to space the pins about the carrier body.

2. The power tool of claim 1, wherein a first one of the spacing angles is employed between a first pair of adjacent pins and wherein all other pairs of adjacent pins employ a second one of the spacing angles.

3. The power tool of claim 2, wherein the first one of the spacing angles has a magnitude of 84 degrees and wherein the second one of the spacing angles has a magnitude of 92 degrees.

4. The power tool of claim 1, wherein each first planet gear has a first quantity of teeth, wherein each second planet gear has a second quantity of teeth and wherein a ratio of one of the first and second quantities to the other one of the first and second quantities is an integer.

5. The power tool of claim 4, wherein the integer is equal to two (2).

6. The power tool of claim 1, wherein the carrier body comprises first and second plates, wherein the pins extend between the first and second plates, and wherein the compound planetary gears are received between the first and second plates.

7. A power tool comprising:
a housing defining a handle;
a motor received in the housing;
a trigger mounted to the handle and coupled to the motor, the trigger being adapted to control operation of the motor in response to an input provided by an operator of the power tool by coupling the motor to a source of power;

an output member;

a transmission coupling the motor and the output member, the transmission comprising a planetary stage with a planet carrier, a plurality of planet gears, and a ring gear, the planet carrier having a carrier body and a plurality of pins that are fixed to the carrier body, each of the planet gears being rotatably mounted on associated one of the pins, wherein the pins are spaced circumferentially about the carrier body such that each pair of adjacent pins is spaced apart by a spacing angle, and wherein at least two different spacing angles are employed to space the pins about the carrier body.

8. The power tool of claim 7, wherein a first one of the spacing angles is employed between a first pair of adjacent pins and wherein all other pairs of adjacent pins employ a second one of the spacing angles.

9. The power tool of claim 8, wherein the first one of the spacing angles has a magnitude of 84 degrees and wherein the second one of the spacing angles has a magnitude of 92 degrees.

10. The power tool of claim 7, wherein the carrier body comprises first and second plates, wherein the pins extend between the first and second plates, and wherein the planet gears are received between the first and second plates.

11. A power tool comprising:
a housing defining a handle;
a motor received in the housing;
a trigger mounted to the handle and coupled to the motor, the trigger being adapted to control operation of the motor in response to an input provided by an operator of the power tool by coupling the motor to a source of power;
an output member;
a multi-speed transmission coupling the motor and the output member, the multi-speed transmission comprising a planetary stage with a planet carrier, a plurality of planetary gears, and a ring gear, the planet carrier having a carrier body and a plurality of pins that are fixed to the carrier body, each of the planetary gears being rotatably mounted on an associated one of the pins and meshingly engaged to the ring gear;
wherein using a first one of the pins as a reference point, the pins are spaced circumferentially about the carrier body in a non-symmetrical manner.

12. The power tool of claim 11, wherein each of the planetary gears comprises a first planet gear and a second planet gear that is fixed to the first planet gear for rotation therewith.

* * * * *